United States Patent
Stewart et al.

[11] Patent Number: 6,053,739
[45] Date of Patent: *Apr. 25, 2000

[54] MEASUREMENT OF ATTENTION SPAN AND ATTENTION DEFICITS

[76] Inventors: Donald B. Stewart, 531 E. Wilson, Lombard, Ill. 60148; Thomas D. Sullivan, 6 Hunt Club La., Oakbrook, Ill. 60521

[*] Notice: This patent issued on a continued prosecution application filed under 37 CFR 1.53(d), and is subject to the twenty year patent term provisions of 35 U.S.C. 154(a)(2).

[21] Appl. No.: 08/833,861
[22] Filed: Apr. 10, 1997

Related U.S. Application Data

[60] Provisional application No. 60/014,916, Apr. 10, 1996.
[51] Int. Cl.[7] .................................................. G09B 19/00
[52] U.S. Cl. ........................... 434/236; 434/169; 434/258; 434/362
[58] Field of Search ................................. 434/169, 258, 434/236, 362, 326

[56] References Cited

U.S. PATENT DOCUMENTS

| | | | |
|---|---|---|---|
| 3,922,665 | 11/1975 | Curry et al. | 340/279 |
| 4,464,121 | 8/1984 | Perelli | 434/236 |
| 4,608,601 | 8/1986 | Shreck et al. | 358/146 |
| 4,755,140 | 7/1988 | Rimland | 434/236 |
| 4,829,431 | 5/1989 | Ott | 364/419 |
| 5,230,629 | 7/1993 | Buschke | 434/236 |
| 5,288,233 | 2/1994 | Green | 434/238 |
| 5,344,324 | 9/1994 | O'Donnell et al. | 434/258 |
| 5,511,982 | 4/1996 | Pigache et al. | 434/350 |
| 5,595,488 | 1/1997 | Gozlan et al. | 434/236 |
| 5,678,571 | 10/1997 | Brown | 128/898 |
| 5,803,745 | 9/1998 | Kozak et al. | 434/236 |
| 5,828,943 | 10/1998 | Brown | 434/258 |

Primary Examiner—Valencia Martin-Wallace
Attorney, Agent, or Firm—Jefferson Perkins Foley & Lardner

[57] ABSTRACT

An attention performance test uses a visual display, a test subject input device, a memory and a programmed processor coupled to each of the above to administer a test to a test subject. A test target, which for example can be a word colored in a first color but meaning another color, is attempted to be matched by the test subject to one of a series of sequentially presented visual response targets. In one embodiment, a nonvisual test stimulus is also provided to the test subject, the test subject having previously been instructed to respond to the nonvisual test stimulus (such as a beep) in a particular way. The test also measures the response latency of the test subject, i.e., whether the test subject has assumed a correct position for entering a response. The responses from the test subject are recorded and may be compared with data derived from a test subject database in assessing whether an attention deficit disorder exists.

28 Claims, 15 Drawing Sheets

**ATTENTION PERFORMANCE TESTS (TM)
(APT (TM))
BY**

ATTENTION PLEASE, INC.

*FIG. 10*

POINT AND CLICK YOUR SELECTION

| PATIENT I.D. |—122

124         132
| APT TEST |   | EXIT |          128
                              | ANALYSIS |

126—| APT TUTOR |   | CODE |—130

MAIN MENU FORM

*FIG. 11*

AUDITORY TARGET
LEVEL 1
4, A  + BEEP
Beep = 3.5Khz sound
FIG. 19a
AUDITORY TARGET
LEVEL 2
8, A   BEEP ONLY
Beep = 3.5Khz sound
FIG. 19b
AUDITORY TARGET
LEVEL 3
3, A  + BEEP
Beep = 3.5Khz sound
FIG. 19c
CODE = WORD OR COLOR
1 = BLUE
2 = GREEN
3 = YELLOW
4 = RED
5 = PURPLE
A = BEEP
8 = BLANK
FIG. 20
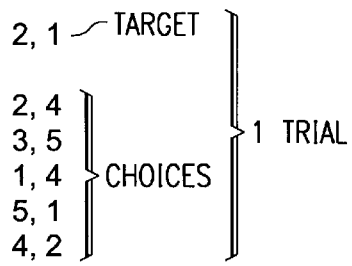
FIG. 21

CLINICAL CODE BOX

ADDAOOOC — 300

Diagnosis

A. ADD

B. ADHD

C. LD

302 —

0. NONE
A. ADD
B. ADHD
C. LD
D. Dyslexia
E. OBD
F. MR
G. CP
H. Ticks
I. Seizure
J. Headaches
K. Depression

130

Medication

A. Ritalin

I. Tegretol

304 —

0. NONE
A. Ritalin
B. Cylert
C. Dexadrine
D. Clondine
E. Tofranil
G. Haldol
H. ORAP
I. Tegretol
J. Depakote
K. Dilantin
L. Phenobarb
M. Zarontin

Patient

0. Control
A. Sibling
B. Parent
C. Student
D. Random

306

Test

0. Test#1
A. Test#2
B. Test#3
C. Test#4
D. Test#5

308

Med Trial

0. PRE MEDS
A. Post < 4 Hrs.
B. Post > 5 Hrs.
C. Post > 24 Hrs.

310

| 312 | 314 | 318 | 320 |
|---|---|---|---|
| DOB | Sex | Handedness | Grade |
| 02/27/88 | M | Right | 2.5 |

EXIT — 322

CODE FORM

*FIG. 25*

MEASUREMENT OF ATTENTION SPAN AND ATTENTION DEFICITS

RELATED APPLICATION

This application claims priority to Provisional Application Ser. No. 60/014,916, filed Apr. 10, 1996, and assigned to the assignee hereof.

TECHNICAL FIELD OF THE INVENTION

This invention relates in general to methods and apparatus for diagnosis of educational disabilities, and more particularly to a method and apparatus for the detection and measurement of attention deficits.

BACKGROUND OF THE INVENTION

Attention span is a normal function of our brain. Our level of attention of thoughts/objects and/or persons in our environment can be variable from moment to moment, minute to minute, hour to hour, and day to day.

There is a normal waxing and waning of our level of sustained attention span when we are reading, watching, listening, and even talking. On one extreme we can raise our attention level to sustain a maximum visual attention response (stare) to a threatening bee flying around in a room we are in. Nothing else can distract us for that sustained moment or minute. But we are unlikely to be able to sustain a vigilant stare at that bee for an hour or a day. Our attention span would begin to wax and wane by other distractions, plans, or tasks that would enter our mind. On the other end of the extreme scale we try to maintain our maximum level of sustained auditory attention when we are listening on a telephone to a serious family tragedy that just occurred. If a bee suddenly flies and buzzes around our face and ears our level of sustained vigilant auditory attention would be less than a moment or even a few seconds. It would be unlikely that we could sustain our undivided listening attention under these circumstances for a minute or an hour.

These two extreme scenarios are not common or realistic. A more common example would be to imagine two different persons who try to concentrate on reading a book. One type of person is able to read and understand what he is reading in any type environment, e.g., on a busy city public bus, in a NFL stadium at half-time, or while the family is watching a television program in the same room. The other type of person, however, cannot sustain his level of attention in reading a book and cannot understand what he is reading even if he were sitting in a quiet library or when he is home alone.

The most realistic example, however, of demonstrating the variability of attention span skills among people would be in a "classroom-like" environment in which a group of individuals must attempt to pay attention, listen and process information. They are all trying to look, listen, and think at high intensity level in a closely bunched group of 20 to 25 other people. Some can pay attention at a 100% level for 1 to 60 minutes. Some can pay attention at 90% level for 1 to 20 minutes. Some can pay attention at an 80% level for only 1 to 5 minutes. Some can pay attention at a 50% level for only 1 to 2 minutes. And finally some can pay attention at only a 10% level for less than a minute.

As one can see, some have superior attention span abilities and function and others have very poor attention span abilities and dysfunction.

If this group of 20 to 25 individuals mentioned above could all be "relatively" homogenous to a set of other variables such as: intelligence level (IQ), ability to process and understand material they are looking, listening and thinking about (learning ability), absence of any significant physical impairment (e.g., vision acuity, hearing acuity, acute illness or chronic diseases), and absence of any acute/chronic emotional stress in their lives or of a reactive situational behavioral problem, they could then all be measured and compared by their ability to sustain attention.

This would be a measurable function of their brain's attention span. There should be a variable level of individual performance when attempting to perform this task.

This measure can be observed by behavioral characteristics in the "classroom" (a behavioral checklist of how well they look and act like they're paying attention). It can also be measured by their performance level of achievement in the material they are paying attention to (testing the ability to retain facts, directions, assignments).

Decades ago the glucose tolerance test (GTT) had to be standardized and tested among many age groups and with many variable normal and abnormal patients and conditions. Today there is a spectrum and a range of expectation on how one's pancreas will react to a "standard" stimulus over a set time. There are super-normal responses, average normal responses, borderline responses, and mild-severely abnormal responses that can be seen and recorded in a random population. There can even be external and environmental factors which may influence the results of the GTT test on a particular day. The clinician, however, must still be trained and become skilled in interpreting the results as correlated with his observed information of the patient to draw his own impressions and conclusions.

Attention Deficit Disorder is a term which defines a spectrum of conditions that may be the result of 1) a transient situational problem, 2) an external environmental factor, 3) another associated primary brain disorder, or 4) truly be the result of an isolated primary defect in the brain (Primary Attention Deficit Disorder).

At the present time the only means of identifying, measuring and diagnosing a Primary Attention Deficit Disorder is by an extensive history (medical, neurological, psychological, social, familial, educational), observation by others (parents, teachers, relatives, peers, friends, employers), behavioral rating scales, and elimination of other contributing or simulating conditions. There is no current "standard" of physiological measurement to assess the brain's ability to sustain attention span.

If a child had a major "epileptic-looking" event in school the physician would try to obtain as much history and first-hand observation report from the teacher regarding this event. Let's say the teacher completes a "Convulsion Teacher Rating Scale" (CTRS) form and graded her observations on a scale of 0–3. She then asks the parent to take this CTRS form to her physician so that he/she could evaluate the event. Would the physician stop at this point and make his decision, impressions and judgments on this information alone? Would he not consider performing a physiological test such as an EEG to assess whether there was an abnormal electrical dysfunction of the brain that correlated with the subjective observations? What if the history and teacher observations reviewed by the physician sounded like a syncopal attack and the EEG was normal? What if the history and teacher observations sounded like a true generalized tonic-clonic seizure but the EEG was normal? What if the history and teacher observations sounded like a syncopal event but the EEG was abnormal for epileptiform activity? All of these three scenarios occur daily in general pediatric practice and the physician must use his training, skills and experience to make a sound, intelligent judgment and decision based on what he/she hears and observes from all available subjective and objective data.

Today physicians only have the history, reported observations of performance, and subjective behavioral rating scales to diagnose Attention Deficit Disorder. The present invention sets an objective physiologic standard of the brain's ability to react to a stress level of multiple attentional tasks measured over a sustained time. The invention enables the establishment of a normative data pool for a wide spectrum of individuals with many variable factors such as age, grade, gender, associated disorders (including ADD, ADHD, LD, seizures, tic disorders, etc.) and employment.

Testing for Attention Deficits

Over the years tests have been reported to selectively assess the brain's attentional span function. Some of these tests include (Mesulam, M. *Principles of Behavioral Neurology*, F. A. Davis (1985) pp 76–82.):

1. Continuous Performance Test
2. Digit Span tests
3. Serial Recitation tests
4. Word List Generation Test
5. Trail-Making Test
6. Stroop Test
7. Go-No-Go Paradigm Test More recently, with the increased interest and research into Alzheimer's Disease (AD), reports have indicated a variety of neuropsychological tests can be useful in diagnosing, tracking progression, and influence of treatments on the clinical course of the disease (Locascio, J. J. et al., *Arch-Neurol* 52:1087 November 1995).

The Continuous Performance Test was first described by H. Enger Rosvold et al. at Yale University in 1956. (H. Enger Rosvold et al., *J. of Consulting Psychology* 20:343 (1956)). Rosvold et al. attempted to show that "brain-damaged individuals should show inferior ability" in tasks that require sustained attention when compared to normal individuals. It was their opinion that the paroxysmal bursts of general hypersynchrony brain wave patterns seen in a brain-damaged individual's EEG was a sign of the brain's sudden, brief reduction of attention span. The customary measures of attention span used at that time was the digit span test and digit symbol substitution test taken from the Weschler-Bellevue Intelligence Test. Rosvold et al. theorized that these tests were not prolonged enough to detect attentional deficits in all brain damaged individuals. They, therefore, designed a test which would need "a high level of continuous attention over an appreciable interval of time" and coined the term CPT (Continuous Performance Test). Using a manual revolving drum with 31 letters mounted in two side-by-side columns, the subject looked through a visor and pushed a response key whenever he saw the appropriate target letter appear at 0.92 second intervals. The targets were divided into an "X task" (every time a letter X appeared in the first column of 31 letters rotated at 10 (5 min) or 20 (10 min) revolutions) or an "AX task" (every X following an A letter was the correct response from the second column of 31 letters on the drum). Their results concluded that the brain-damaged group differed from the control groups and that the differences were even more pronounced when the patient performed the more difficult AX task. They suggested that the CPT was reliable and could prove clinically useful in diagnosing "brain damage".

In 1935 John Ridley Stroop attempted to explain the brain's response to associative interference which occurs when a person takes a longer time to name objects aloud than the corresponding words of the objects took to read aloud. It was well known back in the 19th century by psychologists that it took longer to read the color of patches aligned in rows. Stroop discovered a way to analyze this phenomenon by using a compound stimulus of color words which were incongruent to their ink color. In his three experiments he demonstrated that the hardest task was to name the ink colors of incongruent words. He showed that on the average it took a 74% longer time (47 seconds) to name the color of 100 incongruent color words than to name the color of 100 solid squares. This marked interference response has been termed the "Stroop effect."

Since 1935 there has been an overwhelming acceptance of the Stroop Color-Word test as a measure of attention. Many psychologists have concluded that the Stroop test is highly reliable and valid in its interpretive results. (Jensen, A. R., *Acta Psychologica* 24:398 (65).

Attention Deficit Disorder is usually characterized and defined by three major signs and symptoms: inattention, impulsivity, and hyperactivity. These same symptoms are seen in patients with frontal lobe lesions. Several researchers have attempted to correlate frontal lobe function with several psychometric tests that are more specific to the frontal lobe function (Barkley, R. A., *J. of Abnormal Child Psychology* 20:163 (1992) and Shue, K. L., *Brain and Cognition* 20:104 (1992)). Both of the aforementioned reviewers used the Stroop test in their analysis of ADD/ADHD patients.

In 1993 C. J. Bench et al., using PET scanning techniques, measured regional cerebral blood flow in normal subjects while they performed the Stroop Color-Word Test. They found increased activation in the right orbito-frontal area. They concluded that attentional tasks involve the right hemisphere and in particular the medial frontal structures of the brain.

The inventors have developed a modified CPT form of the Stroop test to measure the attentional function of a wide range of population based on the realizations that: 1) the above research shows that attention function most likely predominates in frontal lobe areas, 2) children with ADD/ADHD simulate some of the behavioral features of frontal lobe damaged patients, and 3) the Stroop test shows activation uptake in the frontal lobe during a PET Scan.

Currently there are other CPT tests which are used to assess patients with the ADD/ADHD syndrome. Most attempt to present a single visual stimulus which the patient must concentrate on and react over a prolonged time. There is no current test which attempts to have the patient concentrate and react to a multimodal stimuli.

Teachers and parents universally complain of two specific problems in their ADD/ADHD children: 1) "they never listen to what I say," and 2) "they can never follow more than two tasks I ask the child to do." Parents never say, "my child doesn't look at me." Parents almost always say, "my child can only do one thing at a time." Therefore the present invention attempts to present both a listening target and a visual target delivered randomly over a sustained time duration. A third component of a thinking task is incorporated into the visual target by utilizing the Stroop format effect. Thus the present invention tests a child's ability to sustain his attention to a combined listening, looking and thinking task. This is similar to the attention stress required in the classroom.

SUMMARY OF THE INVENTION

The test, which can be distributed in the form of a prerecorded computer program, is conveniently administered using a personal computer or laptop computer. As programmed with a set of instructions from the computer program, a processor controls a visual display and a memory, and receives inputs from a test subject input device to administer the test. In the test, a predetermined visual test target is shown on the visual display to the test subject. Subsequent to this, a series of predetermined visual response targets are presented to the test subject, one being representative of a correct choice. While the test subject is viewing the visual response targets, the processor monitors the input device, and records any response which is input by the subject. This sequence is then repeated for each of a plurality of visual test targets. The processor records the test subject responses and, in a preferred embodiment, tabulates these so that they might be compared with statistical averages of similar test data derived from a database containing test data from normal subjects, subject with attention deficit disorder who are not medicated, and other subjects with attention deficit disorder who have been medicated.

According to one aspect of the invention, the visual test target is a word which is presented in a particular color. The color of this visual word target is predetermined independently of the meaning of the visual word target. In one embodiment, the words themselves can be colors; a word "blue" may, for example, be colored green on the display. Subsequently, a series of visual response targets are presented in which each of the visual response targets has a color which matches the displayed color of the last presented visual word target (but not the meaning of the word). The test subject must correctly match one of the visual response targets to the hue of the word target, and must concentrate in order to avoid confusion between the meaning of the word and the color in which the word is displayed.

According to another aspect of the invention, a nonvisual test subject stimulus device issues a nonvisual test stimulus, such as an auditory beep, to the test subject during predetermined ones of the target/response sequences. In this embodiment, the test subject is instructed prior to taking the test to respond in a particular fashion whenever he or she hears a "beep". The processor monitors the response of the test subject and records whether or not an appropriate response to the nonvisual test stimulus is made. The combination of a nonvisual test stimulus or target with a visual test stimulus or target adds a further layer of complexity to the test and requires a greater amount of concentration from the test subject.

According to a further aspect of the invention, the test subject input device measures the latency of the test subject during administration of the test. That is, the test subject input device is capable of sensing whether or not the test subject's hands are in the correct position to respond to one of the visual response targets (or nonvisual test stimulus). This can be accomplished, for example, by determining whether or not a conductive path through the body of the test subject is made or broken between two conductive contacts on the input device. The processor periodically monitors the placement of the test subject's hands in this way, and records these data as a measurement of response latency for later analysis.

Prior art measurements reflect memory recall or a subjective response by others. The test of the invention, on the other hand, performs physiologic measurement of sustained and divided attention span function of the brain.

The test according to the invention attempts to measure the brain's attention span level physiologically through a reaction time response to a set of attention tasks that require a high level of vigilance to a combination of listening, looking, and thinking targets presented over a sustained time. The physiological "stress" that the invention's test gives to the brain is unnatural and not performed by the brain on a day to day basis. The test format, however, attempts to isolate the specific brain function of attention span that can simulate what the brain must do in the "classroom setting". It can be compared to a glucose tolerance test (GTT) used to evaluate the physiological response by the pancreas. The pancreas is given an unnatural physiological "stress" by an overload of sugar delivered to the body. The GTT test then measures the "reaction" response of the pancreas over a sustained time.

BRIEF DESCRIPTION OF THE DRAWINGS

Further aspects of the invention and their advantages may be discerned from reading the following detailed description when taken in conjunction with the drawings in which:

FIG. 10 illustrates an introductory monitor screen of an attention deficit disorder testing and analysis program;

FIG. 11 is a view of a main menu screen of the program;

FIGS. 19a–19c illustrate different forms of an auditory target vector;

FIG. 20 is a vector look-up table indexing numerical values to colors or auditory target types;

FIG. 21 is a diagram of a single trial record;

FIG. 25 is a view of a code screen of the ADD program; and

DETAILED DESCRIPTION OF THE INVENTION

Figure 1:
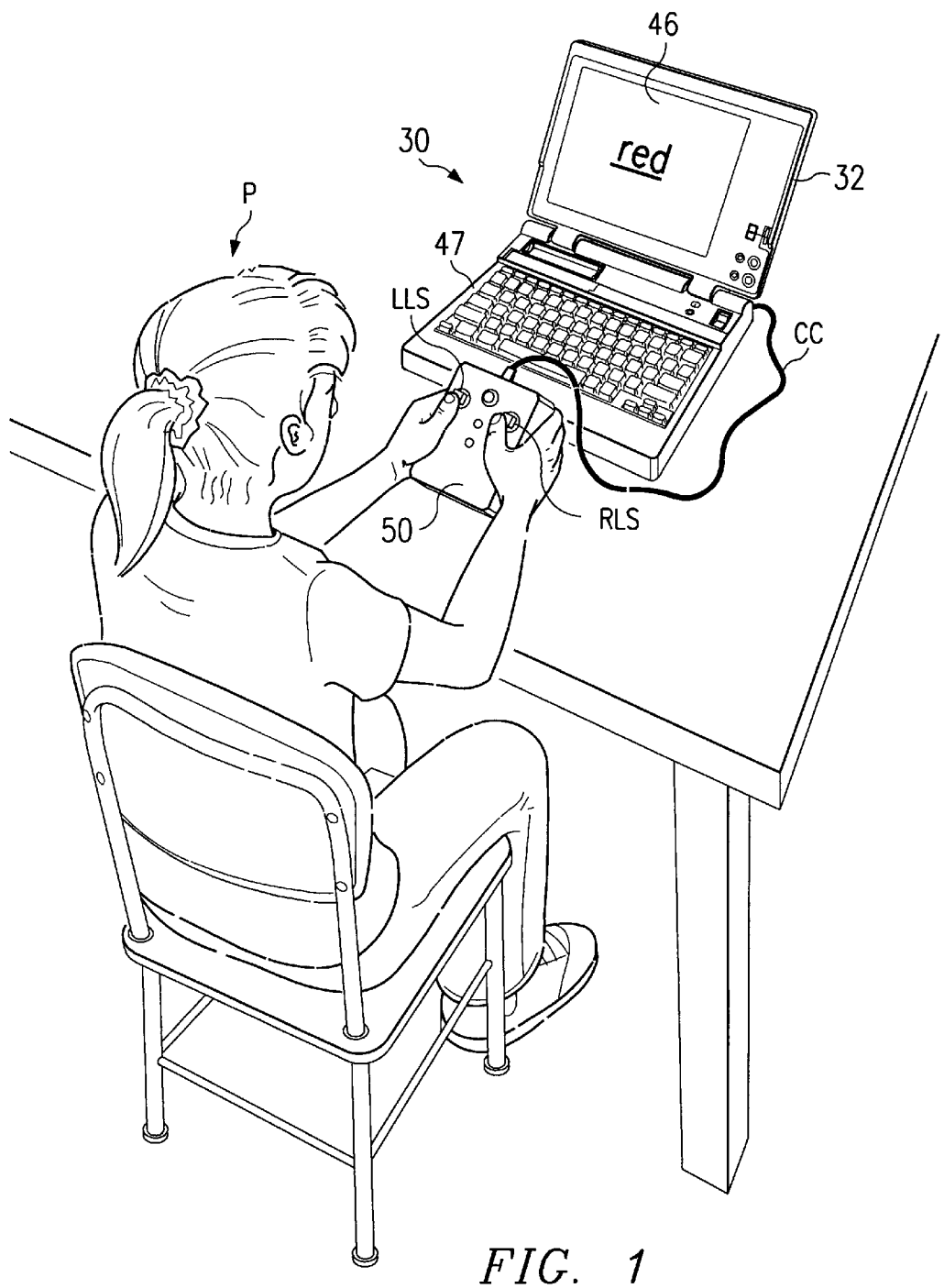
FIG. 1 is an isometric view of a patient taking an attention deficit disorder test according to the invention.
Figure 2:
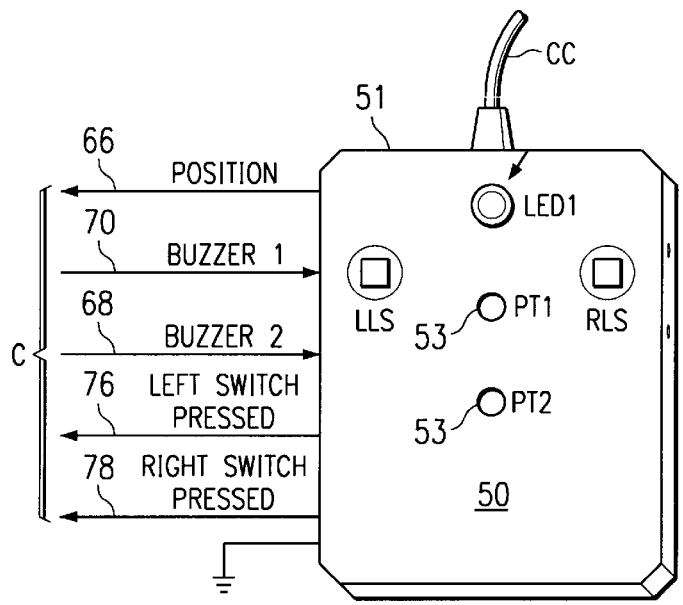
FIG. 2 is a schematic plan view of a hand controller according to the invention.

Referring first to FIG. 1, a patient P is shown seated in a position ready to take an attention deficit disorder test according to the invention. The conditions under which the test is preferred to be taken will be described in more detail below under "Operation". The test-taking equipment indicated generally at 30 includes a computer 32, which for example may be a lap top computer as shown. The lap top computer 32 has a monitor 46 and a keyboard 47. A communications cable CC connects a parallel communication port (not shown in FIG. 1) of the lap top computer to a hand controller 50. As seated and viewing the monitor 46, the patient P grasps the hand controller 50 with both hands, such that his or her thumbs are positioned over the left and right lever switches LLS and RLS. As will be appreciated by those of ordinary skill in the art, a laptop computer has certain standard components: a floppy disk drive; CD ROM drive or both, for transferring programs and data to and from the memory; a hard disk drive; a central processing unit, typically a microprocessor; serial and parallel communications ports; a random access memory; and various interfacing chips and cards, including a video card.

Figure 6:
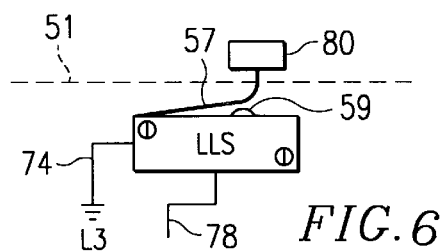
FIG. 6 is a sectional detail illustrating a lever switch according to the invention.
Figure 7:
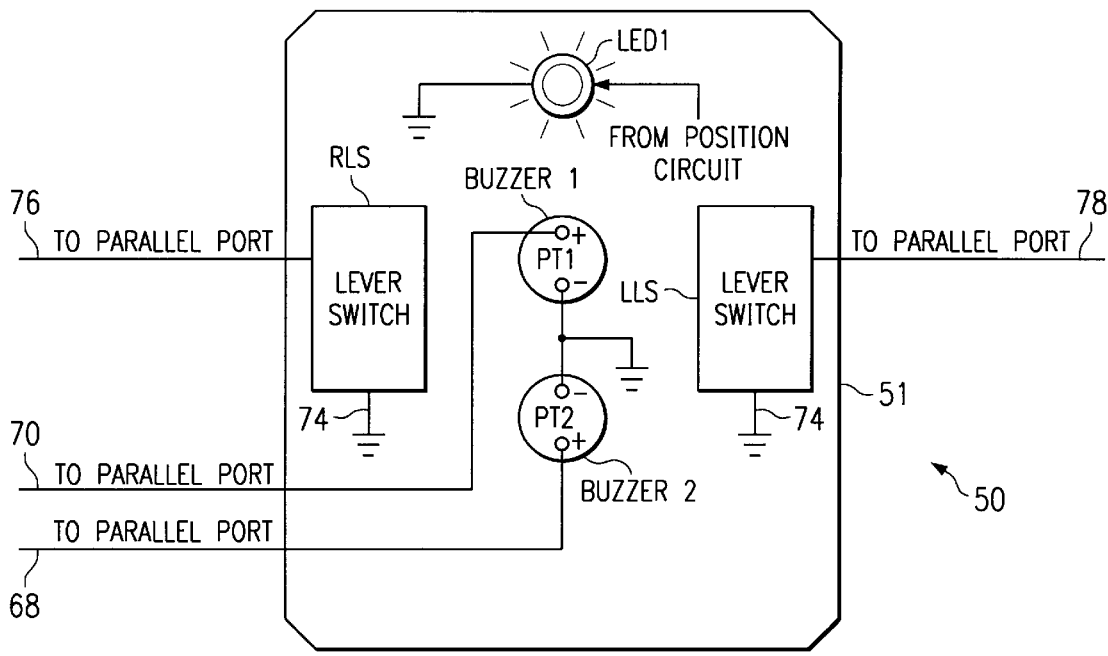
FIG. 7 is a view of the underside of the top panel of the hand controller, showing positioning of lever switches, buzzers and a light emitting diode.
Figure 8:
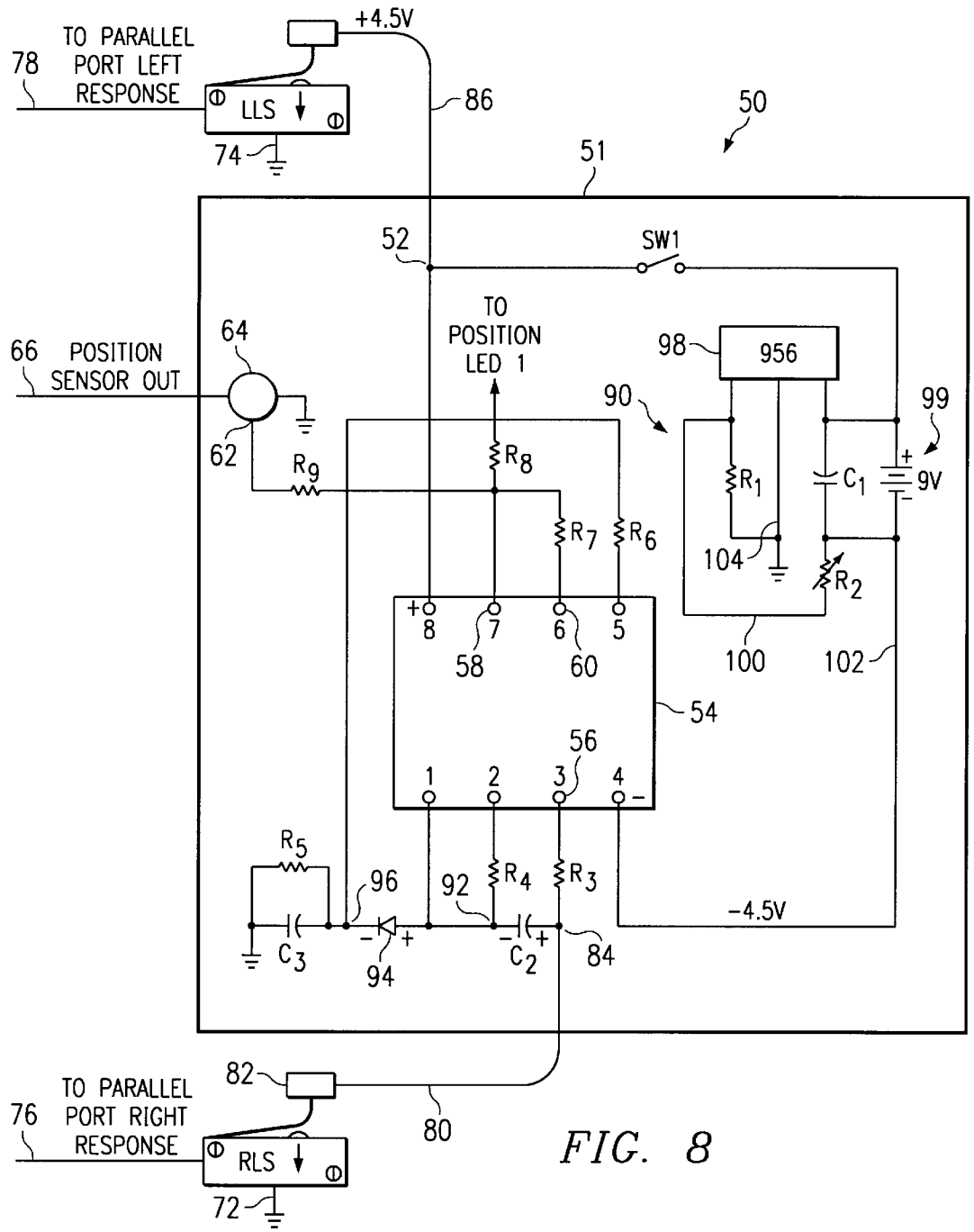
FIG. 8 is a schematic electrical circuit diagram of the hand controller.

The hand controller 50 is illustrated in more physical detail in FIGS. 2–7, and the circuitry contained therein is illustrated in more detail in FIG. 8. The controller 50 communicates with the computer 32, enabling the programmed computer to recognize if the patient P is responding to either an auditory or visual stimulus and whether the response resulted from pressing the right lever switch RLS or the left lever switch LLS.

Figure 3:
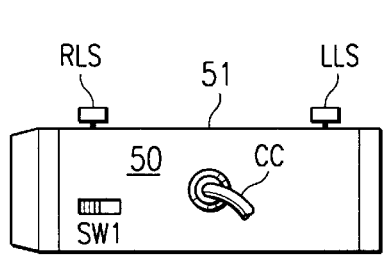
FIG. 3 is an end view of the hand controller shown in FIG. 1.
Figure 4:
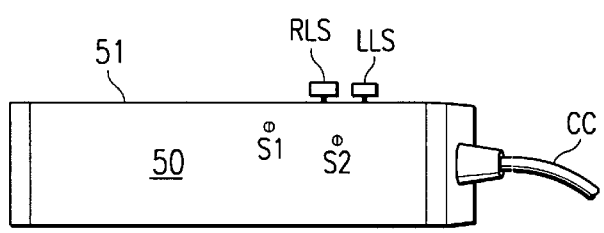
FIG. 4 is a side view of the hand controller shown in FIG. 1.

Referring to FIGS. 2–5, the hand controller 50 may be contained within any suitable case 51, which should be sized such that a patient, typically a child, can easily grasp the sides of the case 51 and place his or her left thumb on button LLS and the right thumb on button RLS, without interference from other portions of either hand. The case 51 is provided with holes 53 for the audio output of sound buzzers PT1 and PT2 (see FIGS. 7 and 8). A hole is also provided for light emitting diode LED1. While in FIG. 2 the various parallel communication lines 66–78 are schematically shown connected to the case 51 at a lower left hand position, in the actual physical preferred embodiment the communications cable CC comes out of the top of the box 51, as is shown in FIGS. 3 and 4.

Figure 5:
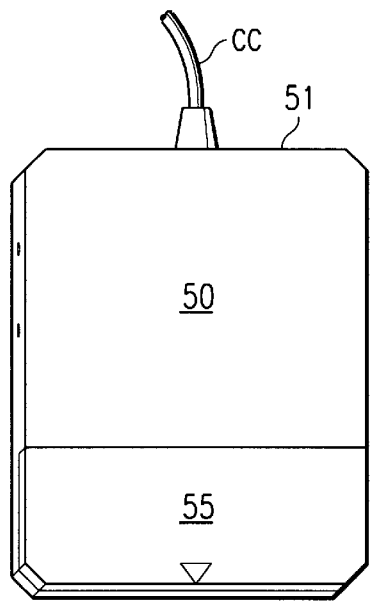
FIG. 5 is a bottom view of the hand controller shown in FIG. 1.

FIG. 3 is an end view of the box showing the position of power switch SW1. FIG. 4 is a side view of the case 51, while FIG. 5 is a bottom view thereof, showing a compartment 55 for the installation of a battery such as a 9-volt radio battery.

FIG. 6 is an interior schematic sectional view, in which the top of the case 51 is illustrated by a dotted line. An appropriate hole is made such that a metal spring 57 protrudes upward through it. The lever switch LLS is mounted as by appropriate screws to the side of the box 51. The limit switch LLS has a signal line 78 and a ground connection 74. The patient presses the cap 80 in order to contact the spring 57 to a metal contact 59. The right limit switch RLS is constructed and mounted similarly, with its mounting screws S1 and S2 being shown in FIG. 4. The patient's hand position is recognized when the patient's thumbs touch the metal caps (left cap 80 shown in FIG. 6) attached to respective lever switches LLS and RLS. When both caps 80, 88 are touched, the patient's body completes a low voltage circuit between input 52 (pin 8) of an operational amplifier (op amp) 54 (FIG. 8) and an input 56 thereof through resistor R3. When the circuit is completed, the op amp 54 sends a signal on an output 58 (pin 7) to the light emitting diode LED1 (FIGS. 2, 7 and 8) through a resistor R8, and further sends a signal from an op amp output 60 (pin 6) through resistors R7 and R9 to a control electrode or base 62 of a preferably bipolar transistor 64. Responsive to the control signal from op amp 54, the current path transistor 64 grounds a conductor 66 of the communication cable CC, allowing the computer 32 to recognize if the patient's hands are in the proper position for the test. Diode LED1 glows when the patient's hands are in the proper position.

As best seen in FIG. 7, which is a view of the underside of the top of case 51, it is preferred that the auditory stimulus for the test be generated inside case 51 of the controller 50. Lines 70 and 68 are connected to 2 Khz piezo buzzer PT1 and 3.5 Khz buzzer PT2 respectively. The use of sound devices PT1 and PT2 standardize the auditory stimulus delivered to the patient, and eliminates the variability of sound devices found in different computers.

Figure 9:
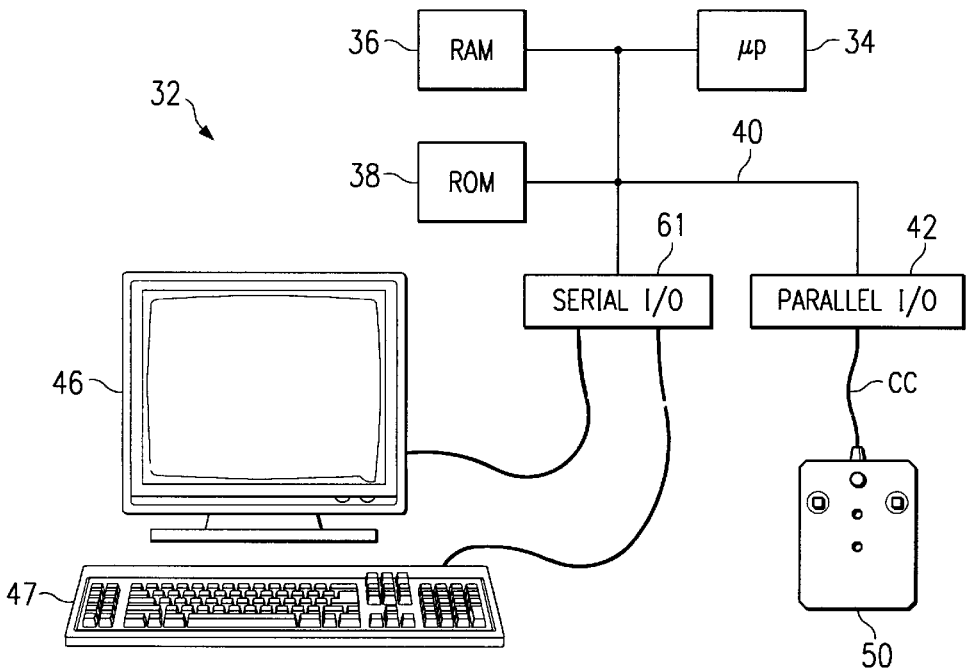
FIG. 9 is a schematic block diagram of an attention deficit disorder testing and analysis system.

Referring to FIG. 8, one pole 72, 74 on each respective lever switch RLS, LLS is connected to the common bus. The other respective poles 76, 78 on the lever switches RLS, LLS are connected by communications cable conductors of the same designation to a parallel port of the parallel interface 42 (FIG. 9). Pressing RLS or LLS lever switches will ground the corresponding nodes 76 or 78, and the parallel port input pins to which they are connected, allowing for the identification of a right and/or left hand response by the computer 32.

A line 80 attached to a cap 82 on lever switch RLS is connected to a node 84. A line 86 connects a cap 88 of the left lever switch LLS to node 52, which is the +4.5 volt side of a 9-volt DC power supply indicated generally at 90. Node 52 is connected to the noninverting input (pin 8) of the op amp 54 in the position sensor circuit (FIG. 8). If the patient touches both RLS cap 82 and LLS cap 88 at the same time, a positive current is delivered to input 52 on the op amp 54.

A capacitor C2 is connected between node 84 and a node 92, which in turn is connected by a resistor R4 to pin 2 of op amp 54, and is further connected to the anode of a diode 94. Node 92 is also connected to a pin 1 of op amp 54. Capacitor C2 is sized to eliminate noise at the first stage of amplification.

The signal is rectified through diode 94 and directed through a short hold circuit R5 and C3 which together have an RC time constant of about 20 msec, and which are connected in parallel between a cathode 96 of diode 94 and ground. Cathode 96 is also connected via a resistor R6 to a pin 5 of op amp 54. The signal is therefore directed from the short hold circuit R5, C3 to pin 5 on the op amp 54, pin 5 acting as a second input of the op amp 54. The signal is then further amplified by op amp 54, and the amplified output is delivered on pin 7 to LED1 through resistor R8 and to the base 62 of transistor 64 through pin 6 and resistors R7 and R9. The transistor 64 grounds line 66 and a corresponding pin on the parallel port, indicating to the computer 32 that the patient's thumbs are in the proper position.

The position circuit above described permits the processor 34 (FIG. 9) to measure the response latency of the subject, because it allows the position of the subject's hand to be recorded.

The power supply 90 uses a voltage regulator 98, such as a NET 956, to create a plus/minus 4.5 volt power supply from a 9 volt battery 99. A variable potentiometer R2 is connected between a node 100 and a node 102, and is used to balance the supply (FIG. 8). A resistor R1 is connected between node 100 and ground. Regulator 98 is connected between node 100 and node 52 through power switch SW1. A capacitor C1 is connected across the terminals of battery 99, which is also connected to node 102 and to node 52 through switch SW1. Regulator 98 has a ground connection 104. Node 102 is connected to a negative power supply pin 4 of op amp 54.

FIG. 9 is a high level schematic block diagram of the entire testing apparatus. As is typical for personal computers, a microprocessor 34 is connected via an appropriate address and data bus 40 to a random access memory 36 and to at least one "read only" memory 38, such as a hard disk drive. The bus 40 further is connected to serial input/output interface circuitry 61, which in turn is connected to the display 46 and the keyboard 47. The bus 40 is connected to a parallel interface 42 which includes a parallel port (not shown) that receives the communication cable CC, in turn connected to the hand controller 50. The computer 32 loads modules of the computer program stored in ROM 38 into RAM 36 and executes it in order to administer and analyze the attention deficit disorder test according to the invention.

ADD Programmed Computer
Starting Program

At powerup, an (ADD1) icon (not shown) is displayed on the computer screen 46. Clicking the icon with a mouse (not shown) changes the program to the ADD 1 Subdirectory and loads an Add1 execution program into RAM. The first form to be executed creates Screen 110 shown in FIG. 10. A timing loop displays screen 110 for 7 seconds, then unloads the screen 110 form and loads the Main Menu form, seen at 120 in FIG. 11. From the main menu the user can select any one of five branches or modules: a patient ID module 122, a test module 124, a tutor module 126, an analysis module 128, or a code module 130. The user can exit the program by clicking on the exit box 132.

Patient ID

Clicking on the patient ID box 122 brings up an input box on screen 120 (not shown) for entering the patient I.D number. A subdirectory is created for all patient I.D. numbers. Every time the patient is tested, the test result files are saved in that particular I.D. Directory. Pressing ENTER or clicking on OK (not shown) on the patient ID input box brings the user back to the Main Menu screen 120.

APT Test Selection

Figure 12:
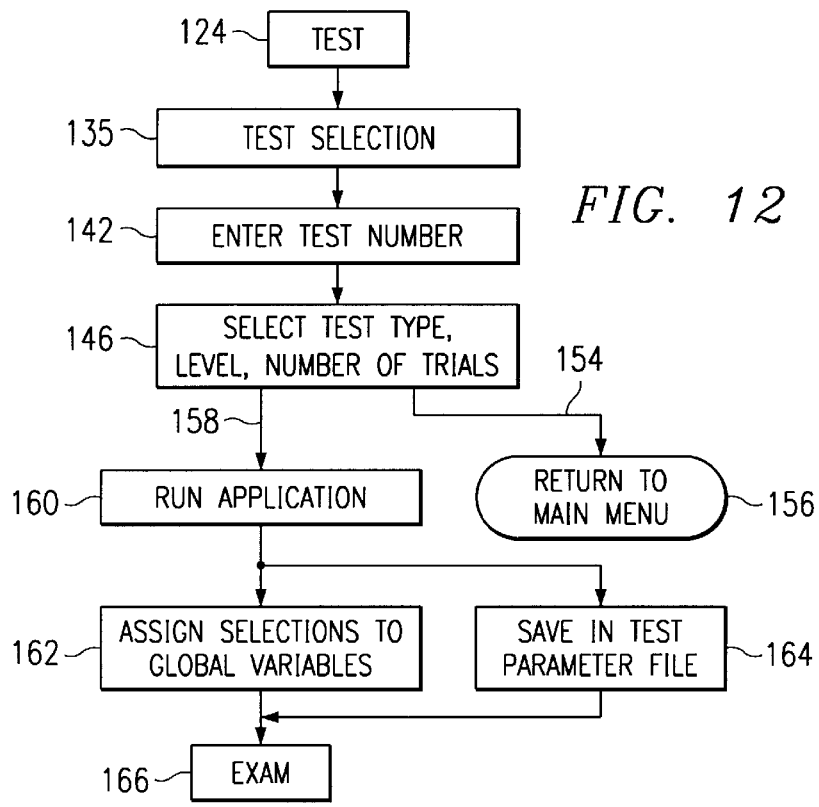
FIG. 12 is a flow diagram of a test selection module of the program.
Figure 13:
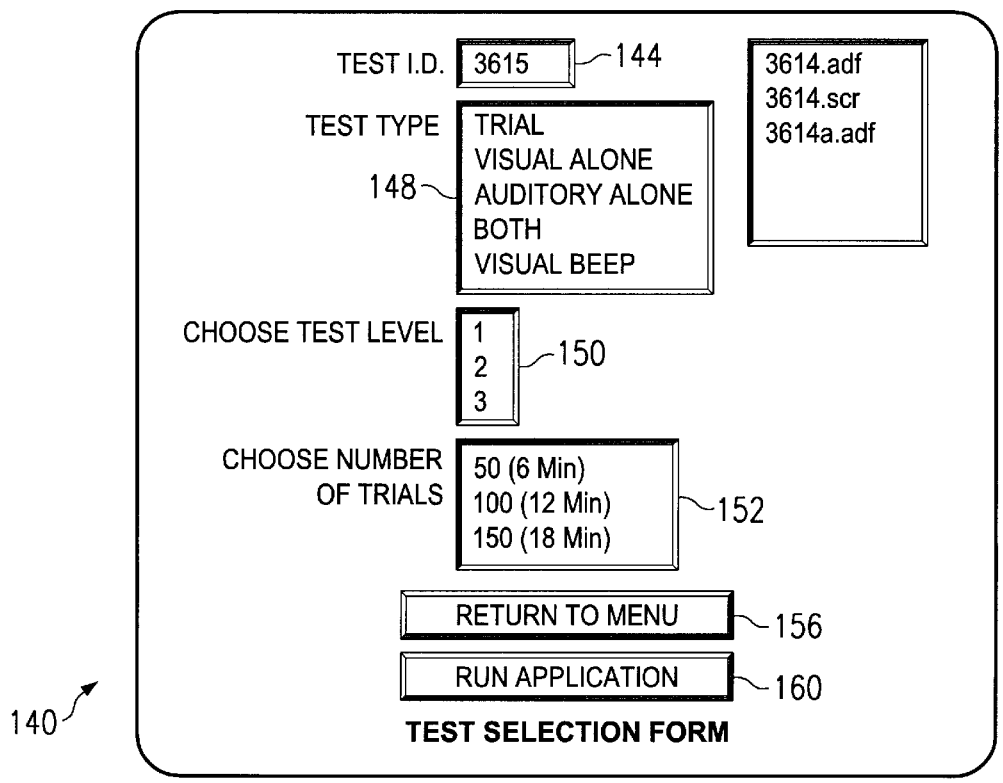
FIG. 13 is a view of a test selection screen of the program.

The test selection algorithm may be best understood with reference to FIG. 12 when taken in conjunction with FIG. 13. When the APT TEST box 124 is clicked on the Main Menu 120, a file list box (not shown) appears with a listing of all files in the Patient's I.D. directory. If the patient had no previous testing, no file box will appear. At step 135, the Main Menu form is unloaded and the TEST SELECTION form 140 (FIG. 13) is loaded. At step 142 in FIG. 12, the user is prompted to enter the test number in the TEST I.D. text box 144 (FIG. 13). Next, at step 146 (FIG. 12), the test type should be selected by pointing and clicking the mouse on one of the test type selections in box 148 (FIG. 13). The TEST LEVEL at box 150 and NUMBER OF TRIALS at box 152 are selected in the same manner.

If the branch 154 (FIG. 12) is chosen and the RETURN TO MENU option 156 is selected, then the Test Selection Form 140 shown in FIG. 13 is unloaded and the Main Menu form 120 (FIG. 11) is loaded.

If the RUN APPLICATION Option at branch 158 (FIG. 12) and box 160 (FIGS. 12 and 13) are selected, all the options selected are assigned to global variables. The selections are also saved in a TEST PARAMETER ASCII file at step 164 (FIG. 12), in the Patient I.D. subdirectory. These data are necessary when an analysis of the test results is performed. At step 166, the test selection form (FIG. 13) is unloaded and an exam form is loaded.

Figure 14A:
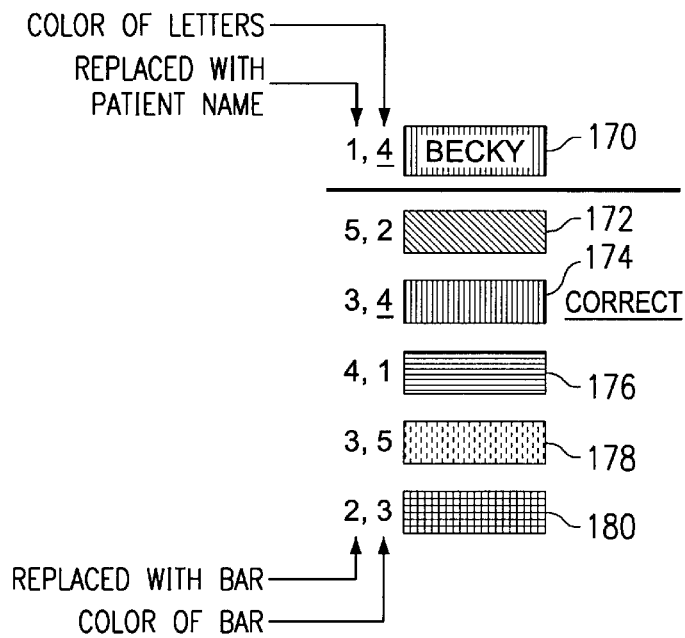
FIGS. 14a–14c are diagrams depicting representative stored trial records for Levels 1–3 of the test, respectively, and illustrating their decoded informational content.

If (LEVEL 1) is selected, the patient will be prompted to type in his or her first name. Throughout the test the target will be the patient's name with the color of the letters being that of the value of the second element of the target record. The choices will each be in the form of a small colored bar, the color being that of the value of the second element in the choice record. The correct choice will be the color bar that matches the color of the letters spelling the patient's name. FIG. 14a represents the different items presented during a trial in a Level 1 test, with each test including a large number (such as 50–150) of trials. A target record 170 will be the same as the patient's name. A plurality of colored response targets 172–180, each having a different color and which in the illustrated embodiment number five such targets, is sequentially presented to the patient after the visual target stimulus disappears.

A test sequence in a Level 1 trial is illustrated in FIGS. 15a–15f. Throughout FIGS. 15a–15f, FIGS. 16a–16f and FIGS. 17a–17f, a uniform striping convention is adopted to show the colors of the objects presented on the screen. Vertical lines indicate that the object is red, horizontal lines indicate that the object is green, lines slanting from the upper left to the lower right indicate that the object is blue, lines slanting from the lower left to the upper right indicate that the object is yellow, and a dotted object is purple. Throughout FIGS. 15a–15f, 16a–16f and 18a–18f, the displayed words and bars have been greatly exaggerated in size for the purpose of clarity. In a preferred embodiment, the words and bars being displayed are much smaller, although larger forms could be generated as shown for the visually impaired.

Referring to FIGS. 15a–f, in Level 1 the name of the patient is used as the visual word target 170. The color of the visual word target 170 is varied from trial to trial within the test. In the illustrated trial, the name of the patient, BECKY, is colored red.

The visual word target then disappears and subsequently a first visual response target 172 appears (FIG. 15b), which for Level 1 is a bar of a particular color. The first bar 172 is green. The second bar 174 (FIG. 15c), which appears a short time after the first bar 172 disappears, is red. The third, fourth and fifth bars (FIGS. 15d–f) are blue, purple and yellow, respectively.

In a Level 1 trial, one of the tasks of the patient is to select the visual response target 172–180 which is the same color as the visual word target 170. In the illustrated example, the selection of color bar 174 is a correct response, because it matches the color of the BECKY image 170. The patient indicates the response by pressing down on one of the lever switches RLS, LLS within a predetermined period of time of the appearance of the color bar. As indicated in FIG. 14a, each particular trial record is stored as a two element vector. The visual word target 170 has a first element or place (1) that indicates that the patient's name should be displayed. A value of 2–5 in place 1 of the vector indicates that the response object to be displayed is a bar. The second element of the vector indicates the color of the object to be displayed, with a particular numerical value being associated with a corresponding color.

Figure 14B:
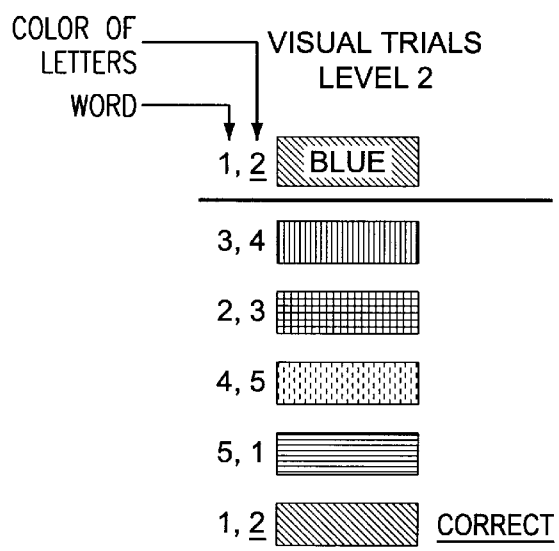
Figure 14C:
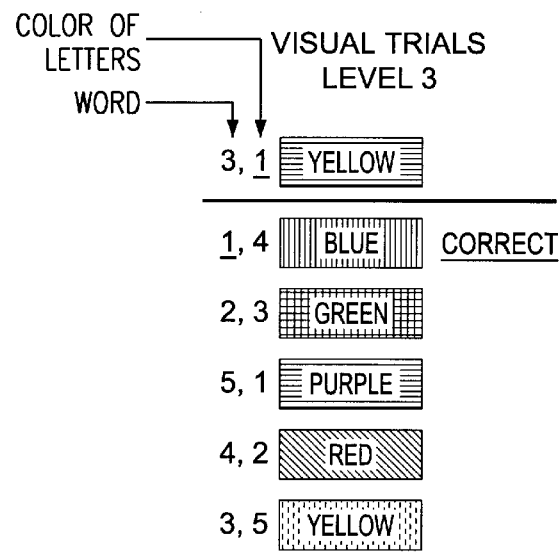
Figure 15A:
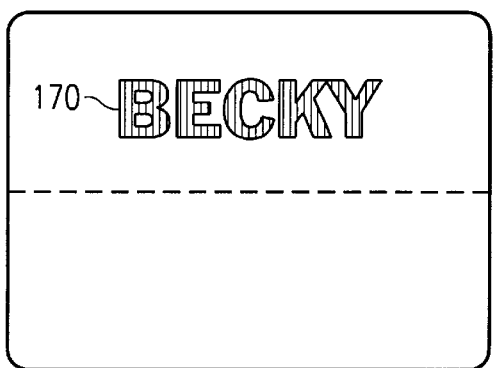
FIGS. 15a–15f are views of sequential test screens generated by an exemplary trial record in a Level 1 test.
Figure 15B:
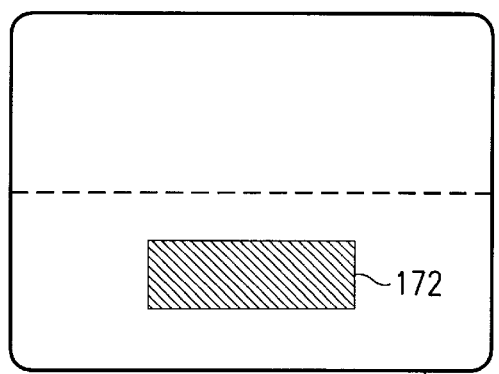
Figure 15C:
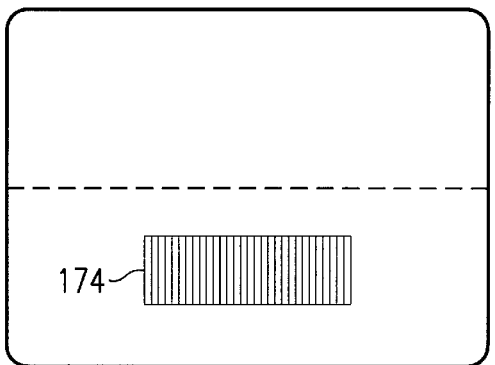
Figure 15D:
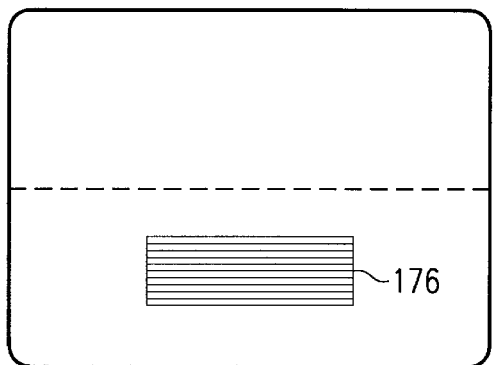
Figure 15E:
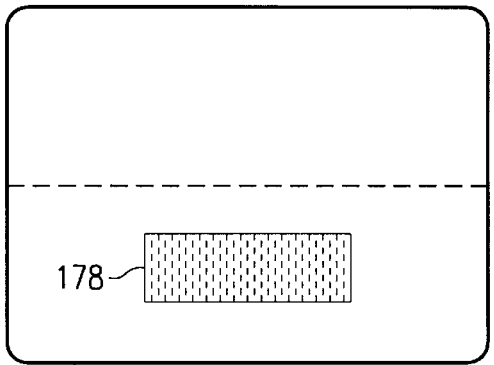
Figure 15F:
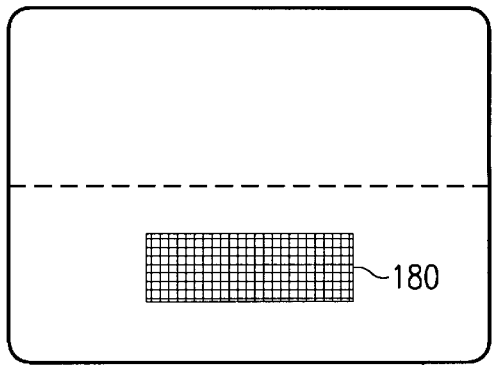
Figure 16A:
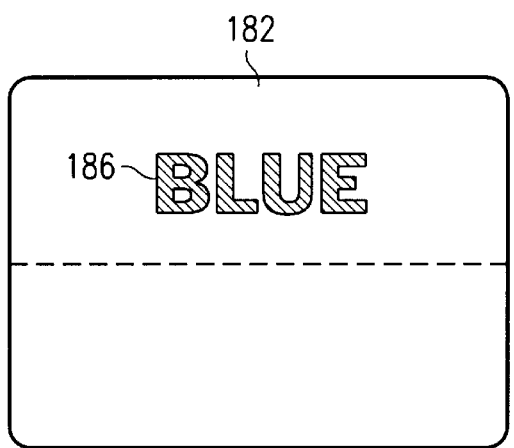
FIGS. 16a–16f are views of sequential test screens generated by an exemplary trial record in a Level 2 test.
Figure 16B:
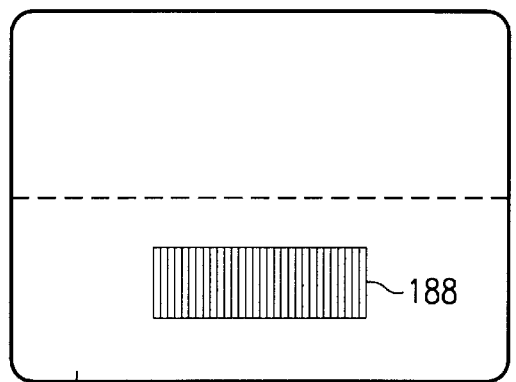
Figure 16C:
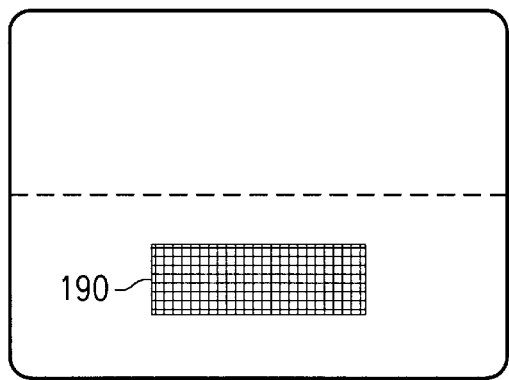
Figure 16D:
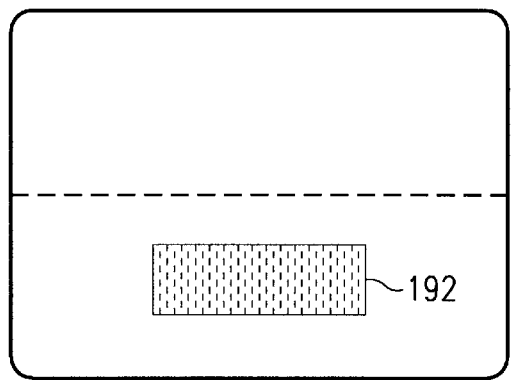
Figure 16E:
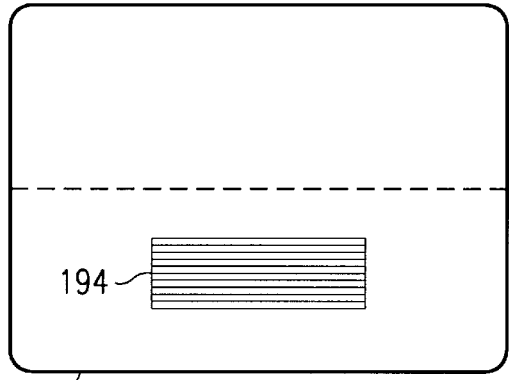
Figure 16F:
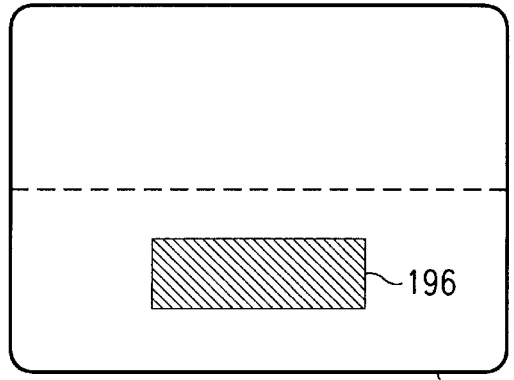

If Level 2 is selected, the identity of the target word is indicated by the first element in the target record (see FIG. 14b). The color of the letters of the target word will be indicated by the second element of the target record. For the response targets, the choices will again be color bars as in Level 1. The correct choice will be the color bar that matches the color of the letters (and not the meaning) of the target word.

A sequence of screens in a trial of a Level 2 test is illustrated by FIGS. 16a–16f. In the first step (FIG. 16a), the word "blue" is displayed in the top half 182 of the screen—but not necessarily in the color blue. In the exemplary trial illustrated, the word "blue" is displayed in a green color. This visual color word target 186 is then removed from the top half 182 of the display 46. A series of color bars 188–196 (FIGS. 16b–16f) is then sequentially presented; in a Level 2 test, the visual response targets are color bars. The test subject or patient is required to match the color of the letters in the word "blue" with the color bar of the appropriate color. In the illustrated example, the green visual response target 196 is the correct selection.

A representative trial record in Level 2 is illustrated in FIG. 14b. The first element in the visual word target vector represents which color word is to be displayed. The second element in the visual word target vector indicates the color in which the word is to be displayed. Thus, for the word "blue" as displayed in green, the vector for the visual word target is "1, 2". The trial record also has a plurality of visual response target records each having two elements; most values for the first element mandate the presentation of a color bar, with the value of the second element indicating the color of the bar presented.

Figure 17:
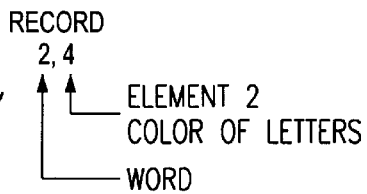
FIG. 17 is a diagram illustrating the form of a single target or response choice vector or record.
Figure 18A:
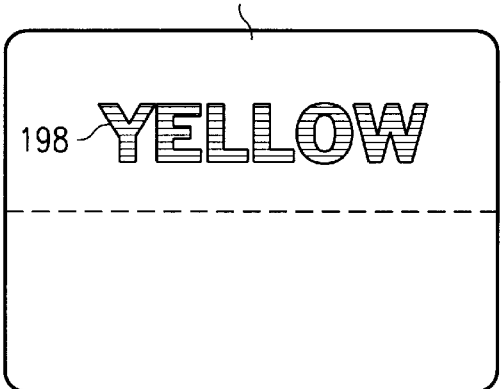
FIGS. 18a–18f are views of sequential test screens generated by an exemplary trial record in a Level 3 test.
Figure 18B:
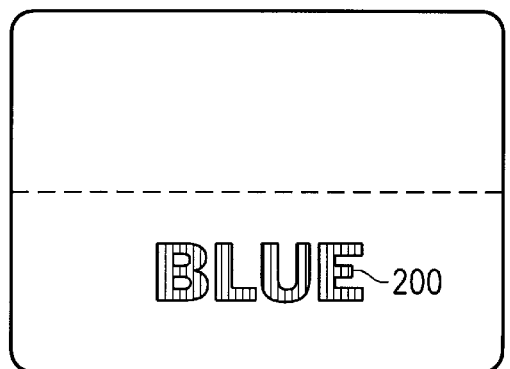
Figure 18C:
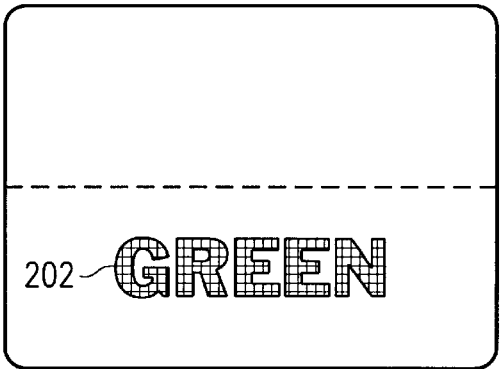
Figure 18D:
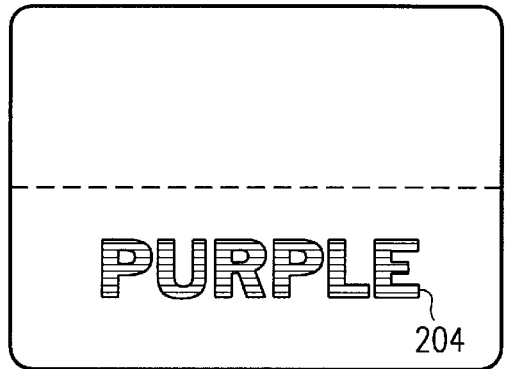
Figure 18E:
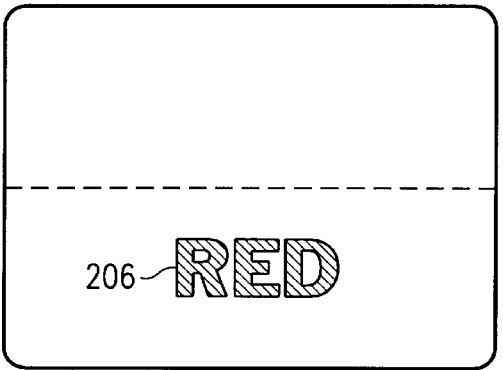
Figure 18F:
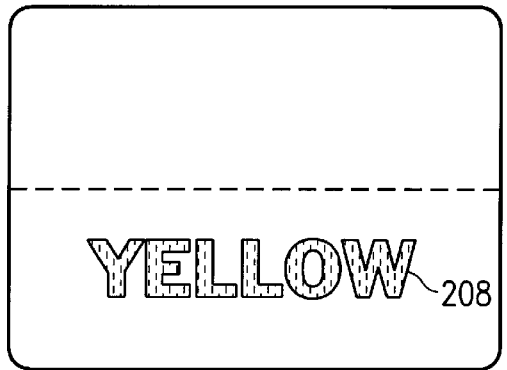

If Level 3 is selected, the visual word target stimulus will be in the same form as in Level 2. The visual response targets will be colored words. As shown in FIG. 17, the first element in the record representing either the visual word target stimulus or the visual response target identifies a color word to be displayed. The second element of the record identifies the color in which the word is to be displayed. A record (2, 4) symbolizes that "green" is to be displayed in the color red.

A representative trial within a Level 3 test is represented in the sequence of screens shown in FIGS. 18a–18f. As in Level 2, a visual word target 198 is first displayed in the top half 182 of the screen. In the illustrated example, the word is "yellow", but it is displayed in a blue color. The visual word target stimulus is then removed and a plurality of sequentially displayed visual response targets are presented, each being a color word depicted in a color not necessarily matching the meaning of the word. Thus, visual response target 200 is the word "blue" depicted in red, the third visual response target 202 is the word "green" displayed in yellow, the next visual response target 204 is the word "purple" shown in blue, the fourth visual response target 206 is the word "red" displayed in green, and the last visual response target 208 is the word "yellow" depicted in purple. The correct choice will be the visual response target having a meaning, but not necessarily a color, that matches the color of the visual word target 198. In the illustrated example, the correct response would be response target 200.

While the various visual word targets are being displayed, at random intervals (at least as experienced by the patient) auditory targets are presented to the patient. Three encoded visual and auditory targets are illustrated in FIGS. 19a–19c.

In addition to being required to respond to each visual target presented, in a preferred embodiment the subject must also respond to pseudorandomly presented nonvisual test stimuli, such as auditory targets or beeps. An auditory target is encoded in the memory of the computer 32 by having its second element be an "A". Two forms of auditory targets may be presented to the subject. In the first form, a visual target appears together with the auditory target or "beep". The form of the visual target is identified according to a number; for example, in FIG. 19a, the number "4" indicates that the subject name "BECKY" appears in red. At the same time that this word is displayed, a "beep" is heard. For Levels 2 and 3, the first element of an auditory target record indicates the meaning of the word displayed (if its value is 1 through 5), but not the color. The color of the visual target displayed in an auditory trial is assigned on a "don't care" basis; in one embodiment, the color in which the visual target is displayed is the same as the color of the last visual response choice. Thus, in FIG. 19c, an auditory target (3, A) indicates that the word "yellow" is to be displayed, and that a beep should sound. The color in which the word is displayed, in this instance blue, is a leftover from the last response target of the last trial.

FIG. 19b illustrates a second-level auditory target record. For any of Levels 1–3, where "8" is the value of the first element in the record, no visual target will be presented at all, and only a beep will sound. The presence or absence of a visual target as presented simultaneously with an auditory target provides an additional distraction which must be overcome by the concentration of the test subject.

FIG. 20 is a look-up table matching the identity of the first or second element of a particular target vector record to a color, an auditory signal, or a "blank", i.e., no visual target is to be presented. FIG. 21 is a diagram of a single trial record; a plurality of such trial records form a test as stored. The first vector or record within the trial record identifies the visual (or auditory) target. The next five vectors or records identify the visual response targets from which the patient can choose.

Figure 22:
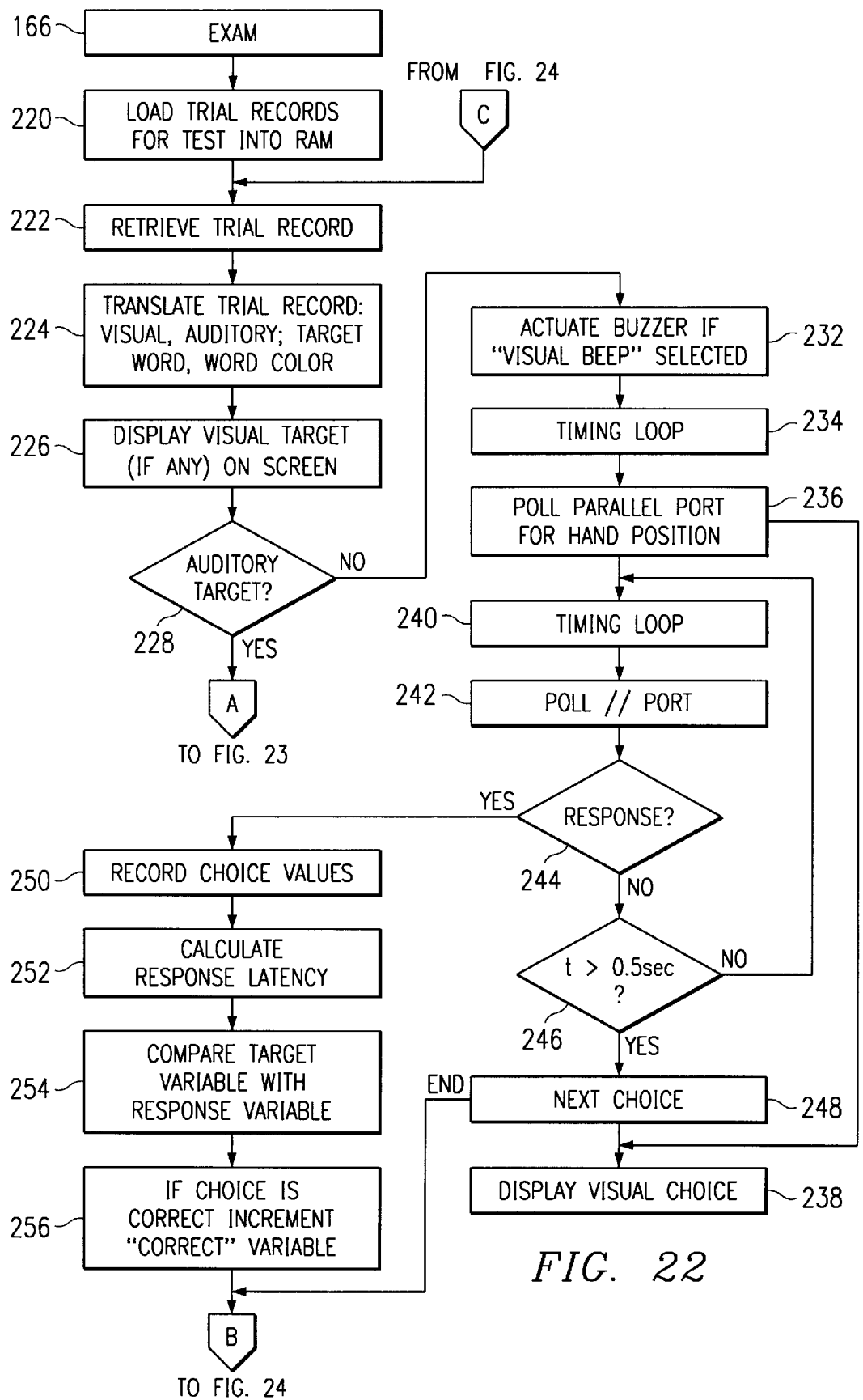
FIG. 22 is a flow diagram of a test module according to the invention.

FIG. 22 illustrates steps taken by the computer program in order to execute a test, after the set-up steps illustrated in FIG. 12 have been accomplished. From block 166, which is a continuation of the block of the same number in FIG. 12, the program loads a number of trial records for the test into RAM. The number of trial records to be loaded had been selected at step 146 in FIG. 12. A ROM data file containing a large number of trials, such as one hundred trials, resides in a directory accorded for the purpose. These trial records are loaded into a RAM variable array, and the ROM data file is then closed.

At step 222, the first trial record is retrieved and is assigned two variables. At step 224, the retrieved trial record is translated into patient-ascertainable contents that depend upon the level of the test being taken. The program will discern whether the trial record is visual or auditory. Further, it will determine the identity of the visual target word and the color in which that word is to be displayed. At step 226, if the trial record contains an encoded instruction to display a visual target stimulus on the upper screen half 182, this will be done.

At decision 228, the program determines whether or not the retrieved trial record is a visual trial or an auditory trial. If it is an auditory trial, the program passes through connector 230 to another program segment to be described below. Assuming that the retrieved trial record is a visual trial, the program branches to step 232.

If the VISUAL BEEP selection had been made at step 146 (FIG. 12), a TTL signal will be sent to the 2 Khz. piezo buzzer PT1 (FIG. 7) in association with any target or choice. This provides an additional distraction while the patient is attempting to select visual choices. At step 234 a timing loop is executed. After the timing loop times out, at step 236 the parallel port is polled to see if the hands are in the proper position for the test. If they are, a position variable for the trial is given a positive value, otherwise the variable is accorded a value of zero. The top of the screen is then cleared and the first choice or visual response target appears on the screen at step 238.

At the same time, at step 240 a time variable is assigned the value of the timer. A timing loop is again executed and at step 242 the parallel port is polled.

If an input is not detected at the parallel port at step 244, the program proceeds to decision 246, which tests whether the elapsed time exceeds 0.5 seconds. If 0.5 seconds has elapsed, then the bottom of the screen clears and at step 248 the next choice is inputted from the data file and displayed at 238. If no input is detected at 244 this cycle repeats itself until the last record is inputted for that trial.

If at step 244 a response is detected while a choice is being displayed, the program assigns the choice values to a variable set at step 250. The program then calculates the response latency at step 252 by subtracting the time variable from the current timer value. After the latency is calculated the response variable is compared with the target variable at step 254. For all correct visual choices, the visual or color correct variable will be incremented by one at step 256 and the latency will be recorded as well. The program then proceeds through connector 258 to FIG. 24.

Figures 23, 24:
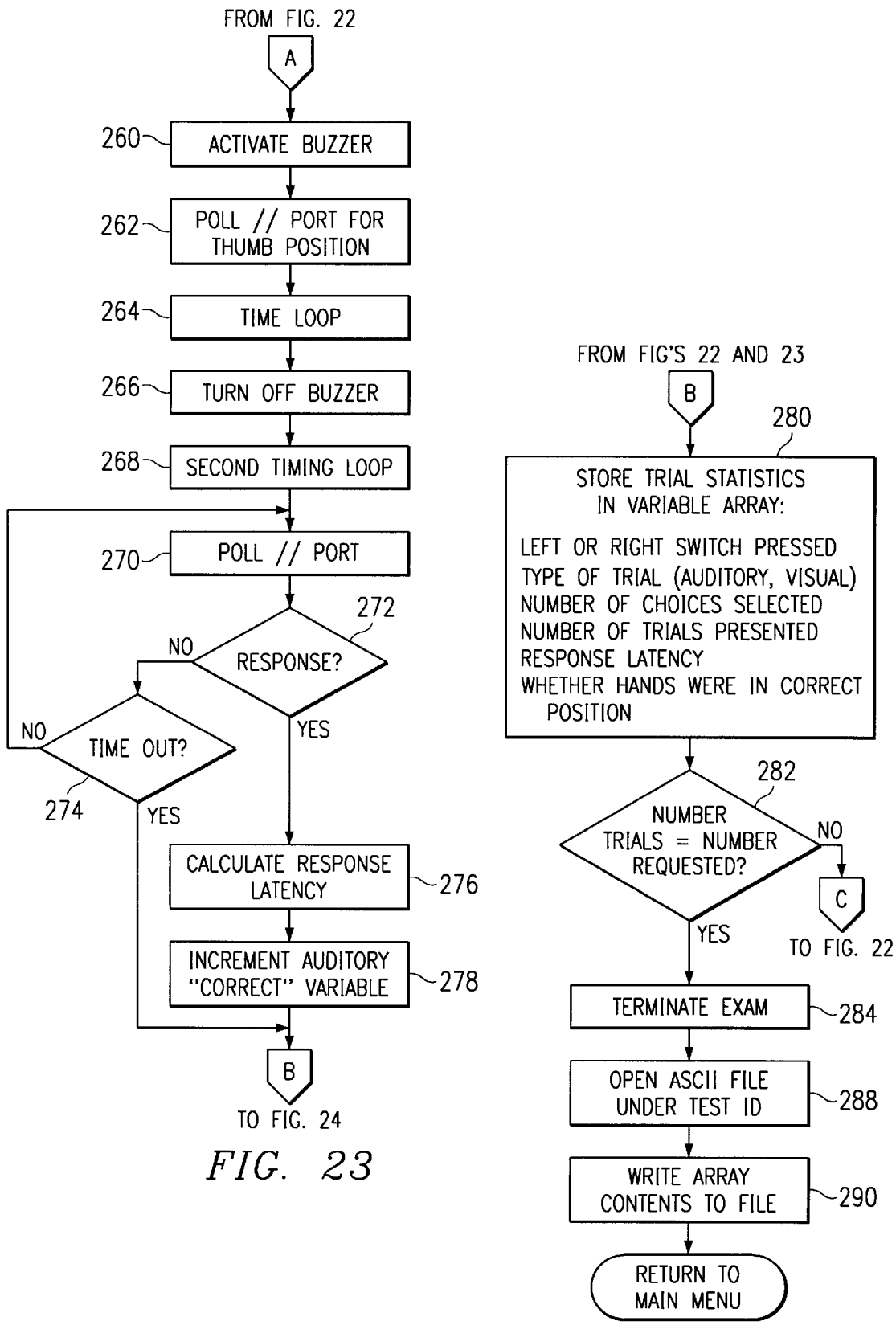
FIG. 23 is a continuation of FIG. 22, illustrating steps taken in an auditory trial.
FIG. 24 is a continuation of FIG. 22 or FIG. 23, showing test compilation steps.

Referring to FIG. 23, if the inputted data record calls for an auditory trial, a value is outputted to the parallel port at step 260, activating the piezo sound transducer PT1 or PT2 in the controller 50 (FIG. 7). Immediately before the output is sent to the parallel port, at step 262 the port is polled to determine if the hands are in the proper position for the trial. A position variable is given a positive value if the position is correct, otherwise the value position variable is set to zero. At the time that the output is sent to the parallel port, a time variable is assigned the value of the timer.

At step 264 a timing loop is executed. At the end of the loop, at step 266 the auditory target i!, turned off and a second timing loop is executed at step 268. The parallel port is again polled at step 270. If a response is sensed at decision 272 before the second timing loop times out at decision 274, the program breaks out of the loop and response latency is calculated at step 276 by subtracting the target time value from the current timer value. The auditory "correct" variable is then increased by 1 at step 278.

If at decision 274 the second timer timed out with no indication of a response, then the program continues to a statistical segment through connector 258 (FIG. 24).

Referring next to FIG. 24, at step 280 certain statistics for the trial just completed are stored in a variable array A:

A(1) If the Left Or Right switch was pressed
A(2) Type of trial (Auditory or Visual)
A(4) What choice number was selected
A(5) Total number of trials presented
A(6) Response Latency
A(7) If hands were in correct position The number of trials selected at step 146 (FIG. 12) indicates the length of the test. When, at decision 282, the number of trials presented matches the number requested, the program terminates at step 284; otherwise, the program loops back through connector 286 to FIG. 22 for the next trial.

At the end of the last trial, at step 288, an ASCII file with the name of the test I.D. is opened, in the patient's I.D. subdirectory. At step 290, the contents of the array are written to this file. The Test I.D. file is later used by the analysis program to calculate and graph the test results.

APT Tutorial

When the APT Tutorial 126 is clicked on the Main Menu (FIG. 11), the Main Menu form 120 is unloaded and a tutorial form (Screen) is loaded (not shown). The APT tutorial is a modification of the APT test program described in FIGS. 13–24. The tutorial is used to walk the patient through the APT test at the instructor's own pace. The timing loops for the target and choice displays are replaced with keystroke commands. For example, the first target appears on the screen until a 'C' key is pressed by the instructor on keyboard 47. The target then clears and the first choice appears. The choice remains on the screen until the instructor presses the 'C' key again. The first choice clears and the second choice appears. No ASCII files are generated by the APT tutorial. The tutorial ends when 'E' on the keyboard 47 is pressed, at which point the APT tutorial is unloaded and the main menu form 120 is loaded (FIG. 11).

Code

When CODE box 130 is clicked on the Main Menu 120 (FIG. 11), the Main Menu form 120 is unloaded and the CODE form 130 (FIG. 25) is loaded. All the information entered from this screen is added to the Test Parameters file that was created in the Test Selection mode (FIG. 13). The clinical code may be entered at 300 by typing the code in the clinical code text box, or by pointing and clicking the selections out of the list boxes 302–310. Date of Birth, sex, handedness and grade need to be typed into the appropriate boxes 312–320. The EXIT box 322 may then be clicked on, at which point all of the selected information is added to the ASCII Test Parameters file. The CODE form 130 is then unloaded and the Main Menu 120 (FIG. 11) is loaded again.

Analysis Module

Figure 26:
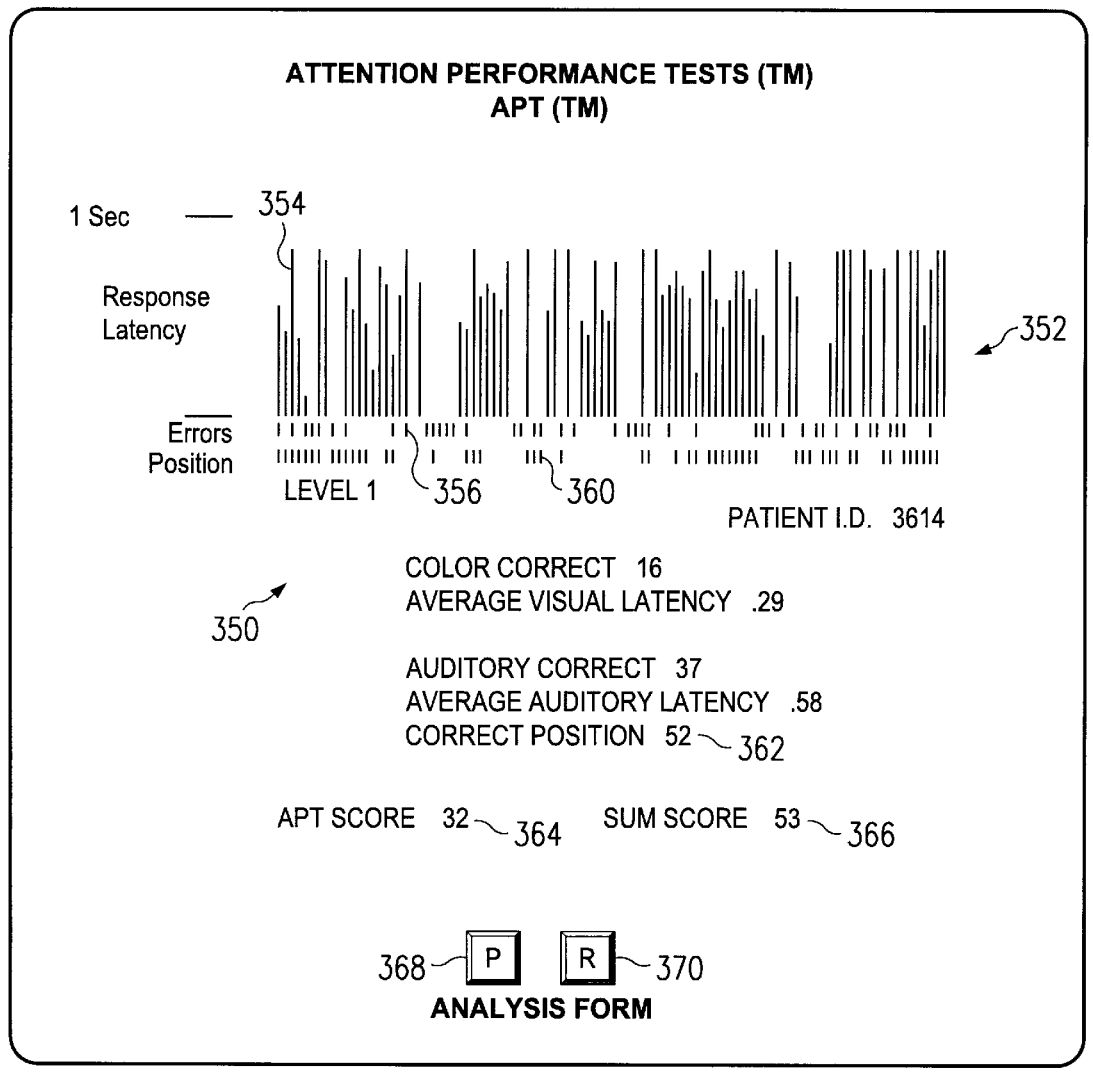
FIG. 26 is a view of an analysis screen showing calculation and compilation of the test results.

Clicking on the analysis box 128 brings up a subdirectory List Box (not shown) for the TEST I.D. numbers within the PATIENT I.D. subdirectory. Clicking on the TEST I.D. to be analyzed will unload the main menu form 120 and will load the analysis form 350 (FIG. 26). The TEST I.D. and TEST PARAMETER files are then opened. As each trial is retrieved from the file, the response latency is plotted on a graph 352 as a vertical line (e.g. line 354). The longer the measured latency, the longer the line. All latencies for auditory responses are plotted in red and all visual response latencies are plotted in blue. If the wrong choice was selected by the patient, a small line (e.g., 356) is plotted as an error line. The color of the error line 356 is determined according to the trial type. If the trial was auditory, the error line will be red. If the error was visual, the response error line will be blue. Under the error lines are plotted the position lines. If the patient's hands were out of position, no line appears. If the response was right handed the position line will be red. If the response was left handed, the position line will be green.

The test level is printed under the position line. The correct visual responses are summed and displayed and the total of all visual latencies associated with the correct position are summed and displayed. The average visual latency is calculated by dividing the sum, of the visual latencies by the correct visual position sum. The correct auditory responses and average latencies are calculated the same way, respectively. The total number of correct responses acquired while the patient was in the proper position is displayed to the right of "correct position" at 362, giving some indication of the level of hyperactivity. The APT score 364 is calculated by doubling the lower of the visual and auditory scores. The sum score 366 is the total of the visual and auditory correct scores.

After the last trial is inputted and plotted by the analysis module, the screen can be form printed to a printer, by clicking the P option at 368. Clicking the R option at 370 will unload the ANALYSIS module (FIG. 26) and load the MAIN MENU form (FIG. 11).

To exit the entire program, EXIT box 132 on the Main Menu form (FIG. 11) is clicked.

Operation

The following are a series of steps in a preferred embodiment of an ADD test according to the invention:

1. Only the patient and the technician should be in the testing room during the administration of the test.
2. The room should be quiet and free of auditory distractions such as telephone calls, overhead music, paging systems and outside room noise.
3. The patient should enter the room when it is well-lighted and with a positive reinforcement that this will be a "fun" experience.
4. The technician shows the patient all of the items which will be used for the test, e.g., the computer 32 (FIG. 1), video screen 46, chairs that he or she and the technician will use, response box 50 with the push down buttons RLS and LLS, printer, etc.
5. The technician turns the computer 32 on and tells the patient that he is going to enter his/her name into the computer 32. The technician also enters other pertinent information on keyboard 47, e.g., age, birth date, gender, grade, etc.
6. The technician enters into the "tutor program" by clicking on box 126 (FIG. 11) and selects "visual alone" mode at 148 (FIG. 13). On screen 140, the technician enters the level, duration and stimuli mode that will be used for the test training period.
7. The technician shows a representative test screen (not shown) to the patient and explain the items that appear on the screen. For example, the different possible color bars appear across the top of the screen. The technician asks the patient to name the colors he/she sees and records his or her response. If the patient cannot identify all the colors correctly, the technician refers to a test manual for further directions.
8. The technician points out that the screen is divided into a top and bottom half. The technician programs a first visual word target to appear on the top half of the screen. The technician then asks the patient to name the word he or she sees (at a Test Level 1, this will be the patient's name (FIG. 15*a*), at levels 2 and 3 this will be a color word (FIGS. 16*a* or 18*a*)). Next, the technician asks the patient in which color the word is being displayed. The technician asks the patient to remember the color that he or she sees and then programs the first response target to be shown on the bottom half of the screen (at Test Levels 1 and 2, this will show as a colored bar (FIGS. 15*b* and 16*b*); at a Test Level 3, this will show as a color word (FIG. 18*b*)).
   a) For Level 1 (FIGS. 15*a–f*), the patient is to match one of a plurality of color bars, which sequentially appear on the bottom half of the screen, with the color that his/her name was in when it was presented as the target visual stimulus on the top of the screen.
   b) For Level 2 (FIGS. 16*a–f*), the patient is to match one of a plurality of color bars, which sequentially appear on the bottom half of the screen, with the color of the color word that had just been presented as the target visual stimulus on the top half of the screen.
   c) For Level 3 (FIGS. 18*a–f*), the patient is to match the meaning of one of a plurality of words, which sequentially appear on the bottom half of the screen, with the color that the color word that had last been presented as the target visual stimulus on the top half of the screen.
9. The technician proceeds to program the five response targets one at a time to appear on the bottom of the screen and asks the patient to select the correct match according to the directions outlined above (a,b,c). The technician may "coach" the patient to reinforce the directions as the technician and patient proceed through the five target responses.
10. When the patient selects the correct target response that appears on the bottom half of the screen, the target is left on the screen and the technician hands the patient the hand controller or latency response module (LRM) 50. The technician informs and demonstrates to the patient that he or she is to hold the module 50 comfortably with both hands with his or her thumbs touching the push buttons LLS, RLS. A red signal from LED1 will light when both thumbs make contact with the buttons LLS and RLS.
11. The technician asks the subject to push the buttons down with one or both thumbs and release, leaving his or her thumbs on the buttons at all times. The patient should practice this maneuver a few times to acquaint himself or herself with the feel and motion of this reaction response.
12. The technician instructs the subject to perform this reaction with the LRM 50 when he or she sees the correct target response on the bottom half of the screen. The technician asks the subject to react and push as quickly as he or she can every time he or she sees a correct matching response.
13. The technician programs the next visual target to appear on the top of the screen and proceeds through the same steps as described above. The technician attempts to see if the patient can respond with less help and guidance. The technician may repeat the visual target trials two to five times. The patient should be able to respond correctly to at least two successive visual target trials without any coaching from the technician.
14. The technician enters the "tutor program" at 126 (FIG. 11) and selects the "auditory alone" test type at 148 (FIG. 13). The technician programs the first auditory target to sound. The technician demonstrates to the patient that when the patient hears the "beep" sound, he or she is to react as quickly as he or she can and push the button(s) on the LRM 50 which they are holding.
15. The technician repeats item 14 several times until the patient can react by himself or herself to the random "beep" sound from module 50.
16. The technician enters the "tutor program" again and selects a "Both" test type level at 148 (FIG. 13), for both visual and auditory stimuli. The technician instructs the patient that he or she will now try to respond to both visual and auditory targets. The technician informs the patient that it is important to react as fast as he or she can whenever he or she hears the "beep" sound, and to match the correct color/color bar (level 1 and 2) or color/word (level 3) response on the screen. The technician informs the patient that the "beep" sound may come with a visual word target on the top half of the screen, or with no word, and they are to push the LRM buttons RLS, LLS whenever there is a "beep" sound, no matter what the patient sees on the top half of the screen.

17. The technician programs the first target from the "tutorial program" and observes if the patient can react correctly to the target stimuli and the target responses. The technician may "coach" the patient at the beginning as the technician advances the targets. The patient should be able to react correctly by himself or herself after 2–10 targets.

18. The technician enters the "trial program" of the tutorial screen (not shown) and select the "auditory alone" test type at 148 (FIG. 13). The technician informs the patient that the technician is going to let the patients try to perform the "beep" sound part of the test alone without the visual targets and see if the patient can respond and react without any help or assistance for about two minutes. The technician proceeds to run the auditory test.

19. Next, the technician enters the "trial program" and selects a "Both" test type at 148 (FIG. 13), which generates both visual and auditory stimuli. The technician informs the patient that the technician is going to let the patient try to perform the test with both the sound beeps and the visual word/color targets together by himself or herself without any "coaching" or help for about two minutes. This is a "practice" run to see if they understand the test. The technician proceeds to run the program and observes the patient's responses. The technician or examiner should be still, quiet and slightly behind the patient and slightly outside the patient's visual field.

20. The technician computes the trial results from items 18 and 19 using the analysis module (FIG. 26). If the patient scores 70% or better on the trials, the patient can proceed to the finalized test program. If the patient's scores are below 70% the technician repeats another two minute trial run and reviews with the patient the general instructions and previous mistakes the patient may have made on the first trial run.

21. The technician enters the "test program" at 124 (FIG. 11) and selects "Both" (at 148 in FIG. 13) and the duration of the test desired at 152 (6, 12, 18 minutes). The technician informs the patient that the technician is now going to run the test which will last a longer time, mentioning the specific time duration. The patient is to try to do the best he or she can and not to get upset or angry if he or she makes an error or mistake. The technician tells the patient that it is normal and common to miss a few targets or a make a few mistakes, and encourages the patient to concentrate on what they are doing and pay equal attention to both the word/color matches and the "beeps". The technician makes sure that the patient understands that the patient is to push the LRM 50 as soon and as fast as he or she can when he or she see or hear the appropriate target response. The technician encourages the patient to be thinking of what he or she should be doing at all tunes during the test.

22. When running the test program, the examiner should remain quiet, still and slightly out of the visual field of the patient.

23. After the test is completed, the examiner compliments the patient on his or her performance. The examiner enters the "analysis" module (FIG. 26) arid types the patient's code to retrieve the log result data. The examiner then prints data analysis for the file and for review.

In summary, the present invention provides an automated and objectively uniform test method in which the test subject is asked to match one of a series visual response targets to an initially presented visual test target. In a preferred embodiment, the initial test target is a word presented in a particular hue but having a meaning not necessarily associated with the hue. The test subject is then asked to match colors of one of a series of sequentially presented visual response targets to the color of the test target. Preferably a nonvisual test subject stimulus, for example an auditory target, is also presented during selected ones of these sequences as a further distraction. Finally, the present invention preferably includes a method of measuring the response latency of the test subject during the administration of the test.

While certain embodiments of the invention have been described in the above detailed description and illustrated in the appended drawings, the invention is not limited thereto but only by the scope and spirit of the appended claims.

What is claimed is:

1. Apparatus for administering an attention performance test, comprising:

storage means for storing a plurality of responses by a test subject to an attention performance test;

a computing device having a memory;

a color display coupled to said computing device for displaying a plurality of colored visual word targets and a plurality of colored visual response targets in response to said computing device;

a test subject input device coupled to said processor to communicate a test subject response to said processor; and a computer program, for execution by the computing device, for administering an attention performance test, said computer program including:

first means for presenting for a predetermined period of time a first predetermined visual word target on said color display to the test subject, a color of the word target being predetermined independently of the meaning of the word target, the word target being a word for a predetermined color, at least some of the meanings of the word targets respectively denoting a color other than the color in which the word target is displayed;

second means for sequentially presenting, after the first means has presented the predetermined visual word target, for predetermined periods of time, a plurality of predetermined visual response targets on the display, at least one of said visual response targets having a color which matches the color of the last presented visual word target;

third means for monitoring, during the sequential presentation by the second means of the predetermined visual response targets, the test subject input device;

fourth means for recording on said memory means, during the sequential presentation by the second means of the predetermined visual work targets, any response input by the test subject, said first, second, third and fourth means, for each of a plurality of next visual word targets, respectively presenting the next visual word target, sequentially presenting a plurality of visual response targets, monitoring the test input device and recording responses; and fifth means for outputting at least to the storage means the recorded responses to the visual response targets.

2. The apparatus of claim 1, wherein said storage means is a hard disk.

3. The apparatus of claim 1, wherein said computer program includes sixth means for determining whether the response of the subject was correct.

4. The apparatus of claim 3, wherein said computer program includes seventh means for storing an indicium of a correct response.

5. A computer software product that includes a medium readable by a computer, the medium having stored thereon:

first means for causing a computer to present, on a color display connected to the computer, for a predetermined period of time, a first predetermined visual word target on a color display to a test subject, a color of the word target being predetermined independently of the meaning of the word target, the word target being a word for a predetermined color, at least some of the meanings of the word targets respectively denoting a color other than the colors in which the respective word targets are displayed;

second means for causing the computer to sequentially present, after the computer has presented the first predetermined visual word target, for predetermined periods of time, a plurality of predetermined visual response targets on the display, at least one of said visual response targets having a color which matches the color of the last presented visual word target;

third means for causing the computer to monitor, during the time that the computer is sequentially presenting visual response targets, a test subject input device coupled to the computer;

fourth means for causing the computer to record on a memory of the computer, during the time that the computer is sequentially presenting visual response target, any response input by the test subject, the first, second, third and fourth means, for each of a plurality of next visual word targets, respectively causing the computer to present a visual word target, to sequentially present visual response targets, to monitor the test subject input device and to record any response by the subject; and fifth means for causing the computer to output at least to the memory the recorded responses to the visual response targets.

6. A method for administering an attention performance test, comprising the steps of:

(a) loading into a processor instructions from a prerecorded computer program, the processor controlling a visual color display, a test subject input device and a memory all coupled to the processor to administer the test to the subject;

(b) presenting for a predetermined period of time a first predetermined visual word target on the color display to the test subject, a color of the word target being predetermined independently of the meaning of the word target, the word target being a word for a predetermined color, at least some of the meanings of the word targets respectively denoting colors other than the colors in which the respective word targets are displayed;

(c) after step (b), sequentially presenting, for predetermined periods of time, a plurality of predetermined visual response targets on the display, at least one of said visual response targets having a color which matches the color of the last presented visual word target;

(d) during step (c), using the processor to monitor the test subject input device;

(e) during step (d), using the memory to record any response input by the test subject;

(f) repeating steps (b)–(e) for each of a plurality of next visual word targets; and (g) outputting at least to the memory the recorded responses to the visual response targets.

7. Apparatus for administering an attention performance test, comprising:

memory means for storing an attention performance test computer program and a plurality of responses to the test of a test subject;

a processor coupled to said memory means for retrieving instructions therefrom, said processor operating in response to said instructions;

a display coupled to said processor for displaying a plurality of visual test targets and a plurality of visual response targets in response to said processor; and an input device controlled by a test subject, said input device coupled to said processor and communicating a response to said processor from the test subject, at least one sensor on the input device detecting whether the subject physically is in a position to select a response target in response to the visual test target;

said processor, said memory means, said display and said input device administering an attention performance test having each of the following steps:

(a) presenting for a predetermined period of time a first predetermined visual test target on said display to the test subject;

(b) after step (a), sequentially presenting, for predetermined periods of time, a plurality of predetermined visual response targets on the display;

(c) during step (b), using the processor to monitor the test subject input device;

(d) during step (c), recording on said memory means any response input by the test subject and whether the subject is in the correct position for responding;

(e) repeating steps (a)–(d) for each of a plurality of next visual word targets; and (f) outputting at least to the memory means the recorded responses to the visual response targets and data concerning whether the test subject was in position to respond.

8. The apparatus of claim 7, wherein said memory means is a hard disk.

9. The apparatus of claim 7, wherein said processor, said input device and said memory means are responsive to the computer program to determine whether the response of the subject was correct.

10. The apparatus of claim 9, wherein said processor and said memory means are responsive to said computer program to store an indicium of a correct response.

11. The apparatus of claim 7, wherein said test subject input device is adapted to be held by the test subject, said input device including means to detect whether the hands of the test subject are in the correct position for inputting a response.

12. A computer-readable medium on which is prerecorded a computer program which, in conjunction with a processor, a memory coupled to the processor, a test-subject-controlled input device coupled to the processor and a display coupled to the processor, administers an attention performance test to the test subject, the computer program including:

first program code means for causing the processor to present, for a predetermined period of time, a first predetermined visual test target on the display to the test subject;

second program code means for causing the processor to sequentially present, for predetermined periods of time after the processor presents the first predetermined visual test target, a plurality of predetermined visual response targets on the display, at least one of said visual response targets being a correct choice;

third program code means for causing the processor to monitor the test subject input device during the sequential presentation by the processor of the visual response targets to detect any response by the test subject;

fourth program code means for causing the processor and the test subject input device to monitor whether the test subject is in the correct position for responding during the sequential presentation by the processor of the visual response targets;

fifth program code means for causing the processor to record, during the sequential presentation by the processor of the visual response targets, on said memory any response input by the test subject and to record the times when the test subject is in a correct position for response, the first, second, third, fourth and fifth program code means causing the processor, for each of a plurality of next visual word targets, to respectively present a visual word target, sequentially present a plurality of visual response targets, monitor whether the test subject responds, monitor whether the test subject is in the correct position, and record any response by the test subject and the times during which the test subject is in the correct position for response; and sixth program code means for causing the processor to output, at least to the memory, the recorded responses to the visual response targets and the times during which the test subject was in a correct position to respond.

13. A method for administering an attention performance test, comprising the steps of:

(a) providing to a processor a set of instructions of a computer program, the processor controlling a visual display, a test subject input device and a memory all coupled to the processor, the processor administering the test to the subject according to the instructions;

(b) presenting for a predetermined period of time a first predetermined visual test target on the display to the test subject;

(c) after step (b), sequentially presenting, for predetermined periods of time, a plurality of predetermined visual response targets on the display, at least one of said visual response targets being a correct choice;

(d) during step (c), using the processor to monitor the test subject input device tc determine if the test subject has selected one of the presented visual response targets;

(e) during step (c), using the process or an d th e test subject input device to monitor whether the test subject is in a correct position to respond;

(f) during steps (d) and (e), using the memory to record any response input by the test subject and times during which the test subject was in the correct position to respond;

(g) repeating steps (b)–(f) for each of a plurality of next visual word targets; and (h) outputting at least to the memory the recorded responses to the visual response targets and the times during which the test subject was in the correct position to respond.

14. Apparatus for administering an attention performance test, comprising:

memory means on which is stored an attention performance test computer program and for storing a plurality of responses to the test of a test subject;

a processor coupled to the memory means for retrieving instructions therefrom, said processor operating in response to said instructions;

a display coupled to the processor for displaying a plurality of visual stimulus targets and a plurality of visual response targets in response to the processor, each of the visual stimulus targets having first and second attributes perceptible to the test subject, at least some of the visual stimulus targets having first attributes which are contradictory to their respective second attributes, the visual response targets having at least first attributes perceptible to the test subject; and an input device controlled by the test subject, said input device coupled to the processor and communicating a response of the test subject to the processor;

the computer program including:

first means for causing the processor to present, for a predetermined period of time, a first predetermined one of said visual stimulus targets on the display to the test subject;

second means for causing the processor to sequentially present, for predetermined periods of time after the processor presents the first predetermined one of said visual stimulus targets, a plurality of predetermined visual response targets on the display, at least one of said visual response targets having a first attribute which matches the first attribute of the last presented visual stimulus target;

third means for causing the processor to monitor the test subject input device during the presentation of the visual response targets;

fourth means for causing the processor to record on the memory means any response input by the test subject during the presentation of the visual response targets, the first, second third and fourth means, for each of a plurality of next ones of said visual stimulus targets, respectively causing the processor to present one of said visual stimulus targets, to present visual response targets, to monitor the test subject input device and to record any response of the test subject on, the memory means; and fifth means for causing the processor to output, at least to the memory means, the recorded responses to the visual response targets.

15. The apparatus of claim 14, wherein the memory means is a hard disk.

16. The apparatus of claim 14, wherein said computer program includes sixth means for causing the processor to determine whether the response of the subject was correct.

17. The apparatus of claim 16, wherein said computer program includes sixth means for causing the processor to store an indicium of a correct response on the memory means.

18. The apparatus of claim 14, wherein the display is a color display, the second attribute of each predetermined visual stimulus target being a word for a predetermined color, the first attribute of each predetermined visual stimulus target being the color in which the word is displayed.

19. The apparatus of claim 14, wherein each visual response target has a second attribute perceptible to the test subject, at least some of the visual response targets having second attributes which are contradictory to the respective first attributes thereof.

20. The apparatus of claim 19, wherein the display is a color display, the first attribute of each visual response target being a word for a predetermined color, the second attribute of each visual response target being the actual color in which the word is displayed.

21. A medium on which is prerecorded a computer program which, in conjunction with a processor, a memory coupled to the processor, a test-subject-controlled input device coupled to the processor and a display coupled to the processor, administers an attention performance test to the test subject, the computer program including:

first means for causing the processor to present, for a predetermined period of time, a first of a plurality of predetermined visual stimulus targets on the display to the test subject, each of the visual stimulus targets having individually predetermined first and second attributes perceptible to the test subject, at least some of the visual stimulus targets having second attributes which are contradictory to their respective first attributes;

second means for causing the processor to sequentially present, after the processor presents the first predetermined visual stimulus target, for predetermined periods of time, a plurality of predetermined visual response targets on the display, each of the visual response targets having at least a first attribute perceptible to the test subject, at least one of said visual response targets having a first attribute which matches the first attribute of the last presented visual stimulus target;

third means for causing the processor to monitor the test subject input device during the presentation of the visual response targets;

fourth means for causing the processor to record, during the presentation of the visual response targets, on said memory any response input by the test subject, the first, second, third and fourth means respectively causing the processor, for each of a plurality of next visual stimulus targets, to present a visual stimulus target, to sequentially present a plurality of visual response targets, to monitor the test subject input device and to record any response by the test subject; and fifth means for causing the processor to output at least to the memory the recorded responses to the visual response targets.

22. The medium of claim 21, wherein the display is a color display, the second attribute of each visual stimulus target being a word denoting a color, the first attribute of each visual stimulus target being a color in which the word is displayed.

23. The medium of claim 21, wherein each visual response target has a second attribute perceptible to the test subject, the second attributes of at least some of the visual response targets being contradictory to the respective first attributes of the visual response targets.

24. The medium of claim 23, wherein the display is a color display, the first attribute of each visual response target being a word for a color, the second attribute of each visual response target being the color in which the word is displayed.

25. A method for administering an attention performance test, comprising the steps of:

(a) loading into a processor instructions from a prerecorded computer program, the processor controlling a visual display, a test subject input device and a memory all coupled to the processor to administer the test to the subject;

(b) presenting for a predetermined period of time a first one of a plurality of predetermined visual stimulus targets on the display to the test subject, each visual stimulus target having first and second attributes perceptible to the test subject, at least some of the visual stimulus targets having first attributes which are contradictory to their respective second attributes;

(c) after step (b), sequentially presenting, for predetermined periods of time, a plurality of predetermined visual response targets on the display, each visual response target having a first attribute which is perceptible to the test subject, at least one of said visual response targets having a first attribute which matches the first attribute of the last presented visual stimulus target;

(d) during step (c), using the processor to monitor the test subject input device;

(e) during step (d), using the memory to record any response input by the test subject;

(f) repeating steps (b)–(e) for each of a plurality of next visual stimulus targets; and (g) outputting at least to the memory the recorded responses to the visual response targets.

26. The method of claim 25, wherein the visual display is a color display, the second attribute of each predetermined visual stimulus target being a word for a predetermined color, the first attribute of each predetermined visual stimulus target being the color in which the word is displayed.

27. The method of claim 25, wherein each visual response target has a second attribute perceptible by the test subject, at least some of the visual response targets having second attributes which are contradictory to the respective first attributes thereof.

28. The method of claim 27, wherein the display is a color display, the first attribute of each visual response target being a word for a predetermined color, the second attribute of each visual response target being the actual color in which the word is displayed.

* * * * *

UNITED STATES PATENT AND TRADEMARK OFFICE
CERTIFICATE OF CORRECTION

PATENT NO. : 6,053,739
DATED : April 25, 2000
INVENTOR(S) : Donald B. Stewart and Thomas D. Sullivan It is certified that error appears in the above-identified patent and that said Letters Patent is hereby corrected as shown below:

On the Title Page, Item [76] Inventors: Change "Thomas D. Sullivan" to -- Thomas D. Sullivan, M.D. --.

Signed and Sealed this

Twenty-second Day of May, 2001

Attest:

NICHOLAS P. GODICI

*Attesting Officer*     *Acting Director of the United States Patent and Trademark Office*